United States Patent [19]
Noreen

[11] Patent Number: 5,512,108
[45] Date of Patent: Apr. 30, 1996

[54] THERMOPHOTOVOLTAIC SYSTEMS

[75] Inventor: Darryl L. Noreen, Hoboken, N.J.

[73] Assignee: R & D Technologies, Inc., Hoboken, N.J.

[21] Appl. No.: 315,062

[22] Filed: Sep. 29, 1994

[51] Int. Cl.$^6$ .................................................. H02N 6/00
[52] U.S. Cl. ............................................................. 136/253
[58] Field of Search ............................................... 136/253

[56] References Cited

U.S. PATENT DOCUMENTS

| | | | |
|---|---|---|---|
| 4,034,557 | 7/1977 | Cerkanowicz | 60/39.06 |
| 4,035,131 | 7/1977 | Cerkanowicz | 431/6 |
| 4,043,308 | 8/1977 | Cerkanowicz | 123/143 R |
| 4,285,193 | 8/1981 | Shaw et al. | 60/39.06 |
| 4,584,426 | 4/1986 | Nelson | 136/253 |
| 4,707,560 | 11/1987 | Hottel et al. | 136/253 |
| 4,726,181 | 2/1988 | Pillsbury | 60/39.06 |
| 4,730,599 | 3/1988 | Kendall et al. | 126/91 A |
| 4,731,989 | 3/1988 | Furuya et al. | 60/39.05 |
| 4,750,943 | 6/1988 | Nelson | 136/253 |
| 4,776,895 | 10/1988 | Goldstein | 136/253 |
| 4,787,208 | 11/1988 | DeCorso | 60/723 |
| 4,793,799 | 12/1988 | Goldstein et al. | 431/79 |
| 4,836,862 | 6/1989 | Pelka et al. | 136/253 |
| 4,850,862 | 7/1989 | Bjerklie | 432/182 |
| 4,900,368 | 2/1990 | Brotz | 136/253 |
| 4,906,178 | 3/1990 | Goldstein et al. | 431/79 |
| 4,948,365 | 8/1990 | Yuen | 432/103 |
| 4,976,606 | 12/1990 | Nelson | 431/79 |
| 5,011,566 | 4/1991 | Hoffman | 156/643 |
| 5,044,939 | 9/1991 | Dehlsen | 432/25 |
| 5,057,162 | 10/1991 | Nelson | 136/253 |
| 5,080,577 | 1/1992 | Bell et al. | 431/7 |
| 5,141,432 | 8/1992 | Bell et al. | 431/7 |
| 5,160,254 | 11/1992 | Bell et al. | 431/7 |
| 5,298,298 | 3/1994 | Hoffman | 428/34.4 |
| 5,356,487 | 10/1994 | Goldstein et al. | 136/253 |

OTHER PUBLICATIONS

Suitor, et al., "Oxygen Production Using Solid-State Zirconia Electrolyte Technology",Technology 2000 Conference, Washington, D.C. (Nov. 27–28, 1990).

Marner, et al., "A Model to Predict the Removal of Oxygen from Air Using a Zirconia Solid Electrolyte Membrane", *Proceedings of the 23rd Intersociety Energy Conversion Conference*, vol. 2, pp. 265–271 (1988).

Suitor, et al., "Oxygen Separation From Air Using Zirconia Solid Electrolyte Membranes", *Proceedings of the 23rd Intersociety Energy Corporation Conference* vol. 2, pp. 273. 277 (1988).

"Cell Theory and Design", *Photovoltaics Technical Information Guide,* Second Edition, pp. 10–20 (1988).

Hsu, et al., "Experimental and Numerical Study of Premixed Combustion within Nonhomogeneous Porous Ceramics", *Combust. Sci. and Tech.,* 90, pp. 149–172 (1993).

Xiong, "Experimental Study of Ultra–Low Emission Radiant Porous Burner", presented ath the AFRC 1991 Spring Members Only Meeting, Hartford, CT, Mar. 18–19, 1991.

Wright, et al., "Dense–Ceramic Oxygen Conducting Membranes", *Advanced Oxygen Separation Membranes,* pp. 33–45 (1990).

(List continued on next page.)

*Primary Examiner*—Aaron Weisstuch
*Attorney, Agent, or Firm*—Hoffmann & Baron

[57] ABSTRACT

A thermophotovoltaic (TPV) system converts thermal or radiant heat into electricity for use in a variety of applications. The TPV system and method efficiently generate electric power through the combustion of fossil fuels with little or no nitrogen oxides or other undesirable combustion by-products. Combustion temperatures are kept at about 1,700° C. or lower while burning a reactant mixture having an air/fuel ratio of greater than about 3:1. Heat from combustion products can be recycled and recuperated without concern for excessive increases in combustion temperature and subsequent combustor/emitter degradation.

95 Claims, 9 Drawing Sheets

OTHER PUBLICATIONS

Suitor, et al., *Development of Alternative Oxygen Production Source Using a Zirconia Solid Electrolyte Membrane*, Jet Propulsion Laboratory, California Institute of Technology Technical Progress Report for Fiscal Years 1987, 1988 and 1989 (Aug., 1990).

Fraas, "III–V Materials for Photovoltaic Applications" *MRS Bulletin*, (Oct. 1993).

Wanlass, et al., *Epitaxial InP and Related III–V Compounds Applied to Solar Cells*, presented at the 1st International Conference on InP, Norman, OK (Mar., 1989).

Wanlass, et al., "$InP/Ga_{0.47}In_{0.53}As$ Monolithic, Two–Junction, Three–Terminal Tandem Solar Cells", presented at the SPRAT Conference, NASA Lewis REs. Center (Nov. 1989).

Wanlass, et al., "Practical Consideration in Tandem Cell Modeling", *Solar Cells*, 27, pp. 191–204 (1989).

Wanlass, et al., *Development of High–Performance GaInAsP Solar Cells for Tandem Solar Cell Applications*, presented at the 21st IEEE Photovoltaic Specialists Conference, Orlando, FL (May 21–25, 1990).

THERMOPHOTOVOLTAIC SYSTEMS

FIELD OF THE INVENTION

This invention relates to thermophotovoltaic (TPV) systems for converting thermal or radiant heat into electricity for use in a variety of applications. More particularly, this invention relates to a TPV system and method for efficiently generating electric power through the combustion of fossil fuels with little or no nitrogen oxides or other undesirable combustion by-products. Combustion temperatures are kept at about 1,700° C. or lower while burning a reactant mixture having an air/fuel ratio of greater than about 3:1. Heat from combustion products can be recycled and recuperated without concern for excessive increases in combustion temperature and subsequent combustor/emitter degradation.

BACKGROUND OF THE INVENTION

Thermophotovoltaic generators for converting radiant energy from a thermal source into electricity have been known in the art. Conventional thermophotovoltaic generators generally involve a high temperature burner or radiator which becomes incandescent and illuminates thermophotovoltaic cells which convert a portion of the incident radiation into electricity. Numerous patents are directed to various burners and porous support media used in the combustion chamber. For example, U.S. Pat. Nos. 5,141,432, 5,160,254 and 5,080,577, all to Bell, et al., relate to an apparatus and method for conducting combustion within a porous matrix. This apparatus and method involves combusting a mixture of fuel and air in successive zones, the first zone where the mixture is fuel-lean, the second zone which receives the combustion products of the first zone and where the mixture is adjusted to be fuel-rich, and a third zone for receiving the combustion products of the second zone and where the mixture is adjusted to again be fuel-lean. Each of the zones is filled with a porous matrix having void spaces in which substantially all of the combustion occurs. The porous matrix comprises a foam made from zirconia or silica-alumina, or a packed bed comprising balls, saddles or rods.

U.S. Pat. No. 4,850,862 to Bjerklie, discloses a high efficiency, high temperature radiant heating system which has combustor/regenerator units each comprising a porous body with combustion supported in one layered zone and regeneration occurring in an adjacent layered zone in a subsequent cycle. This patent essentially discloses a radiant burner system which has paired or coupled sections. Conduits and associated controls cyclically direct combustible reactants to one combustor/regenerator section while removing combustion products from a companion or paired combustor/regenerator section. The roles of the combustor/regenerator sections are reversed by the controls and conduits on alternate cycles. The zones are preferably stacked, layered or disposed in plate-like fashion adjacent to each other. This geometry allegedly affords a compact, energy efficient construction. This patent discloses the advantages of employing regeneratively coupled porous body combustors which yield relatively low $NO_x$ because the useful temperature limits of the porous media are below that which would cause $NO_x$ generation. The porous media may be formed from a variety of materials such as silicon carbide frit which is held on a supporting form such as a screen, cloth, plate or other substance made from, for example, an alumina composite.

U.S. Pat. No. 4,836,862 to Pelka relates to a combustor/reactor for a thermophotovoltaic process which includes an insulated combustion chamber containing a combustion zone, first and second beds of refractory particles exposed to that zone, means for supplying a first combustion reactant to said zone, means for flowing a second combustion reactant to said zone via one of said beds during a first time and via the other of said beds during a second time, means for removing combustion products from said zone via the other of said beds during the first time and via the one bed during the second time, and thermophotovoltaic cell means exposed to heat radiated from said zone.

In general, $NO_x$ formation can be retarded by reducing the concentration of nitrogen and oxygen atoms at the peak of combustion temperature or by reducing the peak combustion temperature and residence time in the combustion zone. This can be accomplished by using combustion modification techniques such as changing the operating conditions, modifying the burner (emitter) design, or by modifying the combustion system. Of these techniques, modification of the burner design has been the most widely used. Low $NO_x$ burners are generally of the diffusion burning type, designed to reduce flame turbulence, delay the mixing of fuel and air and establish fuel-rich zones where combustion is initiated. Numerous patents relating to these techniques include U.S. Pat. No. 4,787,208 which discloses a low $NO_x$ combustor having a rich zone where $NO_x$ formation is inhibited by a low combustion temperature; U.S. Pat. Nos. 4,731,989, 4,535,165, 4,726,181, 4,730,599 and 4,285,193 all use catalytic stages in an effort to obtain low $NO_x$ combustion. U.S. Pat. No. 5,141,432 describes a low $NO_x$ burner apparatus having at least one combustion zone defined by a porous high temperature-resistant matrix and a cooling means mounted in proximity to an input end of the combustion zone.

Conventional TPV combustors or generators suffer from low efficiency, i.e. 10 to 15% efficiency, primarily due to an inability to recycle or recuperate the heat lost without overheating the system or subjecting the emitter materials to temperatures beyond their operating range. For example, U.S. Pat. No. 4,836,862 to Pelka describes thermal efficiencies which are relatively high, i.e. 72%, but this is achieved at temperatures exceeding 1900° C. These temperatures are problematic not only from a materials limitation standpoint, but also from an emissions standpoint, whereby high $NO_x$ is created. The Pelka patent attempts to compensate for high $NO_x$ emissions through the use of specific catalysts. Due to the high temperatures, however, only specific ceramic oxides are useful. These materials must further be configured into specific geometric shapes, e.g. spheres, in order to tolerate thermal contraction and expansion forces which occur during the cycling of heat throughout the emitter bed. However, particle beds create a tortuous path through which the heated gases, i.e. combustion products, must move. Movement through such particle beds requires increased consumption of energy, since enough pressure must be exerted to physically push the gases through the bed. Thus, although these ceramic emitter geometries ameliorate thermal expansion and contraction forces, they create another problem in the form of pressure drops across the emitter and/or combustion chamber. This drop in pressure creates power consumption inefficiencies, whereby, for example, more fan power or energy is required to move the combustion products through the combustion chamber.

Conventional air/fuel ratios used in combustion systems generally range between 1:1 up to about 3:1. The air/fuel ratio is the ratio of the mass of air to fuel prior to combustion. Ratios greater than 3:1 are known to cause instability in the combustion flame which causes the flame to extinguish. Higher ratios of air to fuel, i.e., lean-burn ratios where significantly more oxygen and mass is present, would allow for maximum conversion of chemical energy to radiant energy. This in turn would result in a higher conversion of thermal energy to electricity, with the result being higher power densities and overall efficiency being greatly increased. Such lean-burn ratios have, heretofore, not been possible in conventional TPV systems. The present invention is also directed at providing for stabilized combustion of exceptionally high, lean-burn ratios at temperatures within the temperature resistance properties of current materials.

Combustion efficiency, however, is not the only problem to be solved in thermophotovoltaic processes. The creation of harmful by-products, i.e. $NO_x$, is to be avoided and the challenge has been to create an apparatus and methodology which allows for efficient combustion, high density output with low $NO_x$ and carbon monoxide emissions. The present invention has disclosed a means of increasing the air/fuel ratio, which to a large degree governs the operating temperatures and hence the emission results. For low $NO_x$, the mixture should be "lean" as opposed to "rich". These terms refer to ratios greater than 1.0 and less than 1.0, respectively. Whereas conventional metal combustors operate on rich or slightly lean ratios, more recent ceramic combustors allow for leaner mixtures and hence lower operating temperatures. As the operating temperature of the burner drops, less $NO_x$ emissions are produced. At leaner ratios, lower temperatures are possible, but the energy emitted also drops. Thus, it is apparent that there is a delicate and complex balance which must be achieved whereby high power density, i.e. high energy output, is obtained using a lean-burn combustion technique.

Heretofore, it has not been possible to maintain a stabilized combustion state using air/fuel ratios greater than about 3:1 without having a combustion temperature in excess of the temperature resistance capabilities of current ceramic materials. Additionally, to be an effective energy producing system, radiant and convective energy which is not harnessed should be recovered and returned to the system. Most preferably such recovered heat should be used to preheat incoming reactants, air and fuel. Preheating of reactants, however, is known to increase combustion temperature which beyond certain limits destroys the ceramics used in the system.

Thus, in one embodiment the present invention addresses this problem of burning reactant mixtures having air/fuel ratios of about 3:1 and greater at combustion temperatures which are useful for currently available ceramics, while utilizing heat recovered from the system and using the recovered heat to preheat the reactants without driving combustion temperatures above those useful for available ceramics.

The prior art has also failed to fully appreciate the need for various components of a TPV system to function in an integrated fashion. Consideration has not been given to maximizing energy output as a function of the total system, as well as minimizing energy losses in transferring energy between components. Instead, the art has focused on improving particular components, for example, a combustor or photocell, independent of their relationship to the efficiency and power density of the system as a whole. By building a system which addresses the problems associated not only with each individual TPV component, but also with their integration into a total system, the present invention represents a departure from the prior art. In addition to the unique, synergistic combination of system components and steps, improvements to various individual components represent other embodiments of the present invention.

It is clear that there is a need for such a TPV system and methodology. The present invention incorporates a unique combination of components to define a system, components and apparatus, as well as a method of achieving same.

SUMMARY OF THE INVENTION:

The present invention relates to TPV systems which include a combustion chamber for combusting a fuel, an emitter supported adjacent to said combustion chamber for emitting combustion-derived radiant energy photons in response to said fuel combustion, a photochemical ignition source as a means for creating ultraviolet photons and a means for delivering said photons to a predetermined location in said combustion chamber to ignite said fuel and to propagate a combustion flame within said combustion chamber; photocell means for receiving and converting said combustion photons into electricity, heat exchanger means for cooling said photocell and reclaiming photocell heat loss, recuperation means for receiving and recycling hot exhaust from said combustion chamber and insulation means for minimizing heat loss sufficient to maintain said combustion flame in said combustion chamber. Additionally, oxygen separation means in the form of a solid oxygen-conducting electrolyte membrane is also included.

The present invention also relates to a TPV process which utilizes lean air/fuel mixtures, i.e. at ratios of greater than about 3:1, produces low $NO_x$ and carbon monoxide emissions, is capable of operating at temperatures of 900° C. or more, and preferably between about 1500° to about 1700° C., and produces high density power output in the form of electricity which can be harnessed for a variety of applications. The combination of these combustion temperatures and air/fuel ratios are further combined with the heat recovered during operation of the system. The recovered heat is used to preheat incoming reactants. The combination of these perimeters and steps are further combined with photochemical ignition.

In particular, the TPV systems and methods of the present invention can be used for military, utility, automotive and power generation applications. The present invention also contemplates thermal to electric conversion efficiencies greater than about 30% with little or no $NO_x$ emissions.

The TPV system of the present invention comprises unique components which when combined as a system achieve a solid state, reduced emissions and lean-burn technology which has heretofore not been disclosed or appreciated. The emitter components are preferably porous ceramic media and are most preferably an array of porous ceramic layers which can be geometrically configured to achieve maximum efficiency in radiant output. These porous burners allow for stable burning of very lean air/fuel mixtures over large areas. Large area burning at substantially constant temperature profiles on the porous media surface is achieved. A heat recovery means, preferably a recuperator, which is either adjacent to or integrated with said burner, may also be fabricated using foamed or reticulated materials or an array of microtubes, preferably made from ceramics, which will improve the efficiency and compensate for loss of radiant or convective emissions of the burner. Using foamed, reticulated or microtube arrays as a heat recovery means allows for exceptionally high internal flow passage surface areas for recuperating thermal losses and redirecting exhaust heat back into the combustion chamber. Other heat recovery means are contemplated, however, including regenerative methods as disclosed, for example, in the aforementioned Pelka patent, as well as porous rotary heat exchanger (flowing axially, radially, or otherwise) conventionally used in gas turbine engines.

The present invention also uses unique ignition means for initiating combustion. Whereas conventional combustion ignition is achieved via preheating and/or spark ignition, the present invention uses photochemical ignition means to initiate free radical oxygen molecules which trigger combustion. By using photochemical ignition, combustion can be initiated at extremely low temperatures, e.g. at room temperature, and in the presence of excess oxygen. This is in contrast to conventional thermal or spark ignition which prevented combustion in the presence of excess air or oxygen, i.e., where air or oxygen was present in excess of 150–200%. In conventional lean-flame burning, excess air, i.e. 200%, results in instability of the flame and eventual extinguishment. The lean-flame limit is generally accepted to be at a 2.5:1 to 3.0:1 ratio of air/fuel, beyond which, even with excessive heat, flame stability is problematic and often not possible. Whereas excess air or oxygen is known to drop the adiabatic temperature, conventional ignition systems have not been successful in allowing for the use of excess air and subsequent lower flame temperatures. The present invention allows for stable combustion of a lean fuel mixture without concern for extinguishment of the flame.

Photochemical ignition may be achieved through various means, but is preferably achieved using an ultraviolet-emitting arc flashlamp or laser beam directed through a collimating or focusing means to a predetermined location in a combustion zone. The arc flashlamp or laser beam may operate continuously or in a pulsed or modulated fashion through said collimating means, which is either filled with an inert gas or contains a vacuum to prevent premature absorption of the ignition photons (ultraviolet radiation) emanating from the photochemical source. The photons have a wave length which is capable of disassociating oxygen molecules, generally in the range of from about 1,400 Å to about 2,450 Å.

The photocell means for receiving and converting radiative energy from the combustion emitter is designed to be operated at relatively high temperatures, i.e. about 25 to about 100° C., and is prevented from degradation via a heat exchanger which preferably employs an array of micro heat pipes or other heat exchange means which efficiently distribute heat from the photocell and recycle such heat for preheating incoming air/fuel mixtures prior to combustion or for other external uses such as water heating, space heating and the like.

As previously stated, the combustion chamber has a heat recovery means, which is designed to recuperate and recycle exhaust that would otherwise be lost from the combustion chamber. Heat recovery can be obtained several ways, including using a fixed recuperator, an oscillating regenerator, or a rotary regenerator.

The present inventive TPV system also contemplates an optical system which is designed to selectively filter and direct radiant thermal energy emanating from the emitter to the photocell and reflect back specific radiant wave lengths to the emitter. Additionally, the present invention also optionally contemplates an emitter design which selectively emits radiant energy of a particular wave length range for optimum photocell power density output.

Thus, one object of the present invention is the creation of a thermophotovoltaic system which allows for a stable, lean burn at lower emitter temperatures than earlier possible and which produces high efficiency conversion with low emissions. Another object of the present invention is a method of efficiently converting thermal to electric energy by combusting very lean mixtures of air and fuel, and whereby the stability of such combustion is maintained by heat recuperation and insulation means, and converting thermal radiation emitting from said combustion into electric power by means of a photocell.

Another object of the present invention relates to a low temperature, low energy input ignition source which photochemically ignites the fuel mixture and allows for very lean mixtures to be ignited and remain stable, i.e. lit.

The present invention also contemplates selective emission of radiant energy as well as filtering mechanisms to selectively transmit radiant thermal energy from the emitter to the photocell.

An additional feature of the present inventive system is a means for separating out pure oxygen from air or other oxygen-containing mixtures using passive membrane members prior to entry of the air or mixture into the combustion chamber.

Other objects of the present invention will become apparent and are described more fully in the following disclosure.

DETAILED DESCRIPTION AND PREFERRED EMBODIMENTS

In one embodiment of the present invention, a combustion process for generating energy comprises: a) providing a ceramic combustor for supporting combustion of the reactant mixture having an initial temperature $T_o$; b) providing a reactant mixture having a given air/fuel ratio to a combustion zone in said ceramic combustor; c) igniting said reactant mixture to propagate a combustion flame at an initial flame temperature $Tf_o$; d) reducing said initial flame temperature $Tf_o$ to a lower temperature $Tf_1$ by providing to said ceramic combustor a reactant mixture having an air/fuel ratio above about 3:1; e) preheating said reactant mixture from said initial temperature $T_o$ to a higher temperature $T_p$ not exceeding the thermal capability of said combustor; wherein maximum conversion of chemical to radiant energy (thermal efficiency) is achieved.

Figure 1:
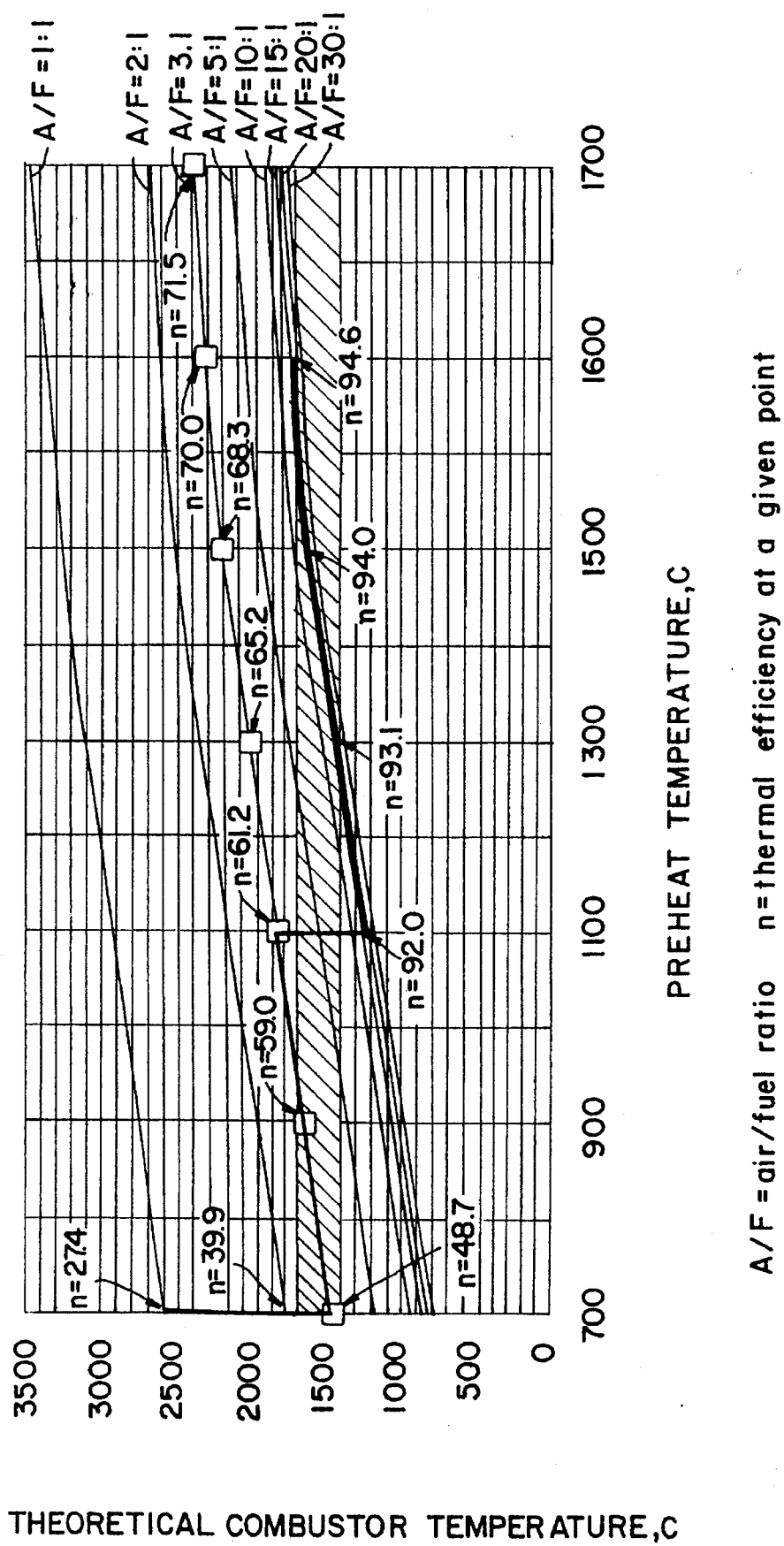
FIG. 1 is a graph showing thermal efficiency theoretically obtainable with given air/fuel ratios within operating ranges achievable with the combustion system of the present invention.

The air/fuel ratio in this embodiment of the present invention is preferably greater than about 3:1 to about 30:1. The air/fuel mixture, also referred to as the reactant mixture, may be premixed prior to introduction into the combustion zone, or mixed in the combustor/emitter itself. As previously mentioned, it has not been possible to obtain stabilized combustion at air/fuel ratios in this range with combustion temperatures and preheat temperatures which were safe for commercial ceramic materials. The igniting of the reactant mixture in this embodiment is preferably achieved by photochemical emission, whereby an ultraviolet wavelength sufficient to dissociate oxygen molecules is used. This wavelength is preferably in the range of about 1,400 Å to about 2,400 Å. The combustion temperatures, assuming an adiabatic system, as well as the preheat temperatures, can be calculated for various air/fuel ratios. Referring to FIG. 1, this graph shows the theoretical combustion temperature (Y axis) for combustion of a methane-air mixture. The theoretical combustion temperature is called the adiabatic flame temperature. The preheat temperature (X axis) on the graph is the number of ° C. that are added to the reactants prior to combustion. The air/fuel ratio is the ratio of mass of air to fuel in the reacted mixture prior to combustion. Stoichiometric combustion requires 17.17 pounds of air per pound of methane. This is an air/fuel ratio of 1:1. A ratio of 3:1, for example, would be about 51.5 pounds of air per pound of methane.

FIG. 1 also shows a hatched area between about 1,400° C. and 1,700° C. which is considered a safe operating range for most commercially available ceramic materials. This is the operable range in which the materials can be used for a substantial amount of time without degrading. The present invention is also designed to operate at temperatures of greater than 1,600° C. preheat at an air/fuel ratio of 3:1 if materials in the combustor/emitter are able to withstand the 2,300° C. temperatures in the combustion zone. Presently, two ceramic materials $Al_2O_3$, which melts at about 2,000° C. and $ZrO_2$, which melts at 2,715° C. are available. Referring again to FIG. 1, the graph shows the combustion temperatures and preheat temperatures which are possible for a given air/fuel ratio, assuming ideal heat transfer, i.e. no heat loss in the system. As depicted on the graph, given an air/fuel ratio of 3:1, at preheat temperatures of greater than about 1,000° C. the combustor temperature is too high for available ceramic materials. The present invention uses air/fuel ratios of greater than 3:1, which are shown on the graph as 5:1, 10:1, 15:1, 20:1, and 30:1. As shown on the graph, substantially higher preheat temperatures can be achieved while maintaining the combustor temperature at or below the operating limit of the ceramic materials. Additionally, at various temperature points on the graph, efficiency rates have been calculated, for example, at an air/fuel ratio of 3:1, the efficiency at a combustor temperature of 1,800° C. and a preheat temperature of about 1,100° C., a 61.2% thermal to radiant efficiency is achieved. In contrast, at air/fuel ratios of 20:1, at a preheat temperature of 1,100° and a combustion temperature of about 1,200° C., a 92% thermal to radiant efficiency is achieved.

As previously mentioned, an air/fuel ratio of 3:1 is currently considered the lean flame limit and current TPV combustor systems must operate below the air/fuel ratio of 3:1. Above this ratio, the flame extinguishes for conventional combustors.

Figure 2:
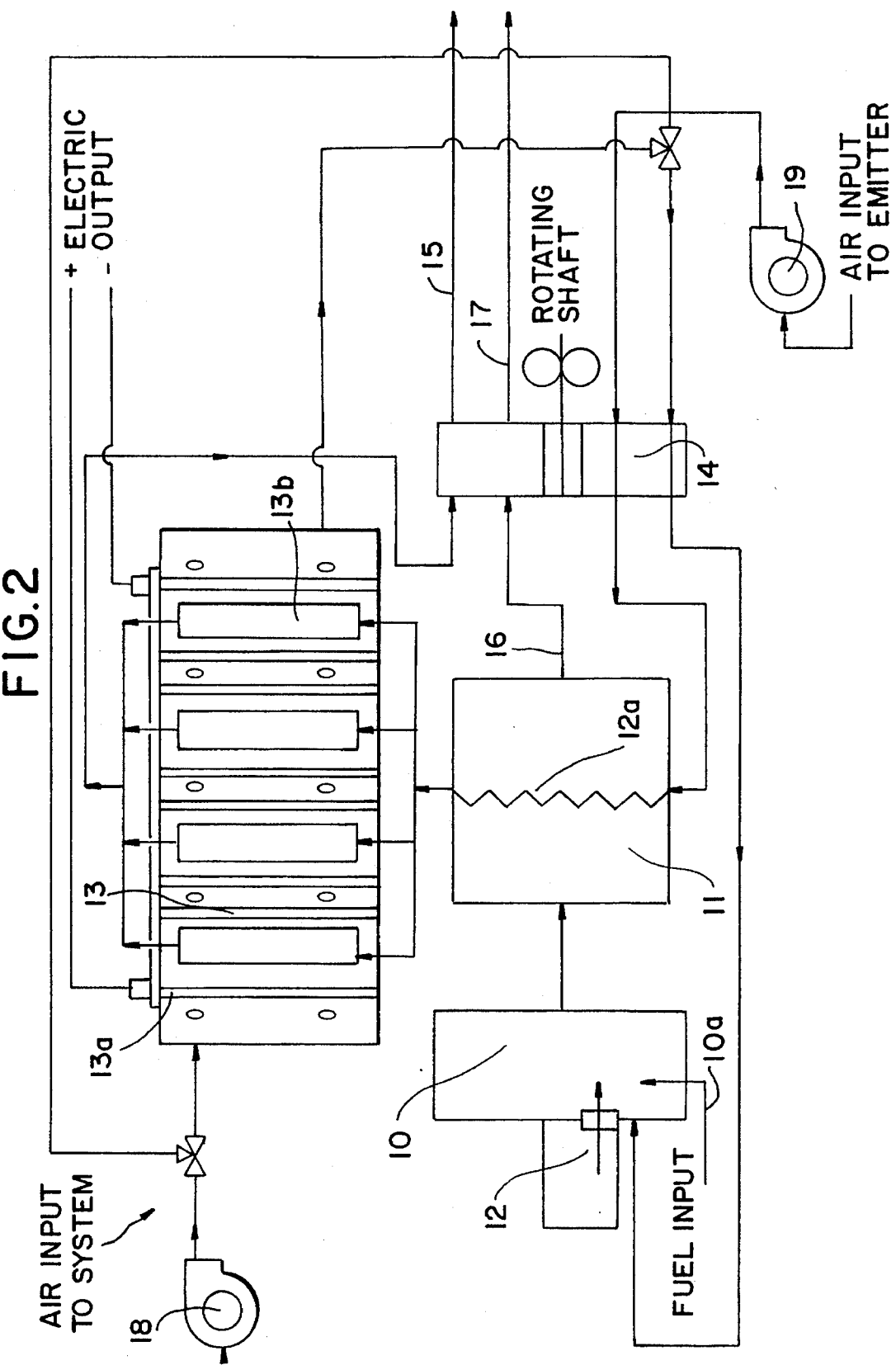
FIG. 2 shows schematically, an embodiment of the thermophotovoltaic (TPV) combustion system of the present invention.

Referring now to an embodiment of the present invention, FIG. 2 depicts a schematic of a TPV system showing its various components. As seen in the Figure, a ceramic combustor 10 receives a reactant mixture, e.g. fuel from line 10a. Photochemical emission source (igniter) 12 is adjacent said combustor and serves to radiate ultraviolet wavelengths sufficient to dissociate oxygen molecules in said combustor 10. Heat from said combustor 10 is captured in emitter core 11, which as depicted in the Figure has an emitter heat exchanger 12a, adjacent thereto. Radiant energy is emitted from said emitter 13b to a photocell array 13. Photocell array 13, as depicted in FIG. 2, has a series of photocells 13a containing ceramic emitter radiators 13b for distributing radiant energy to said photocells. Conversion of thermal energy to electrical energy takes place in said photocells and electrical output results as shown from FIG. 1. During the conversion process, heat loss from said array of photocells is recuperated into recuperator unit 14, which can be a heat wheel as shown. Low temperature exhaust is expelled from the system as shown by line 15. Additionally, line 16 shows exhaust from said emitter core through said recuperator and which is expelled via line 17. The photocells are cooled by air via fan 18. Additionally, room temperature air is fed via fan 19 through said recuperator.

Figure 3:
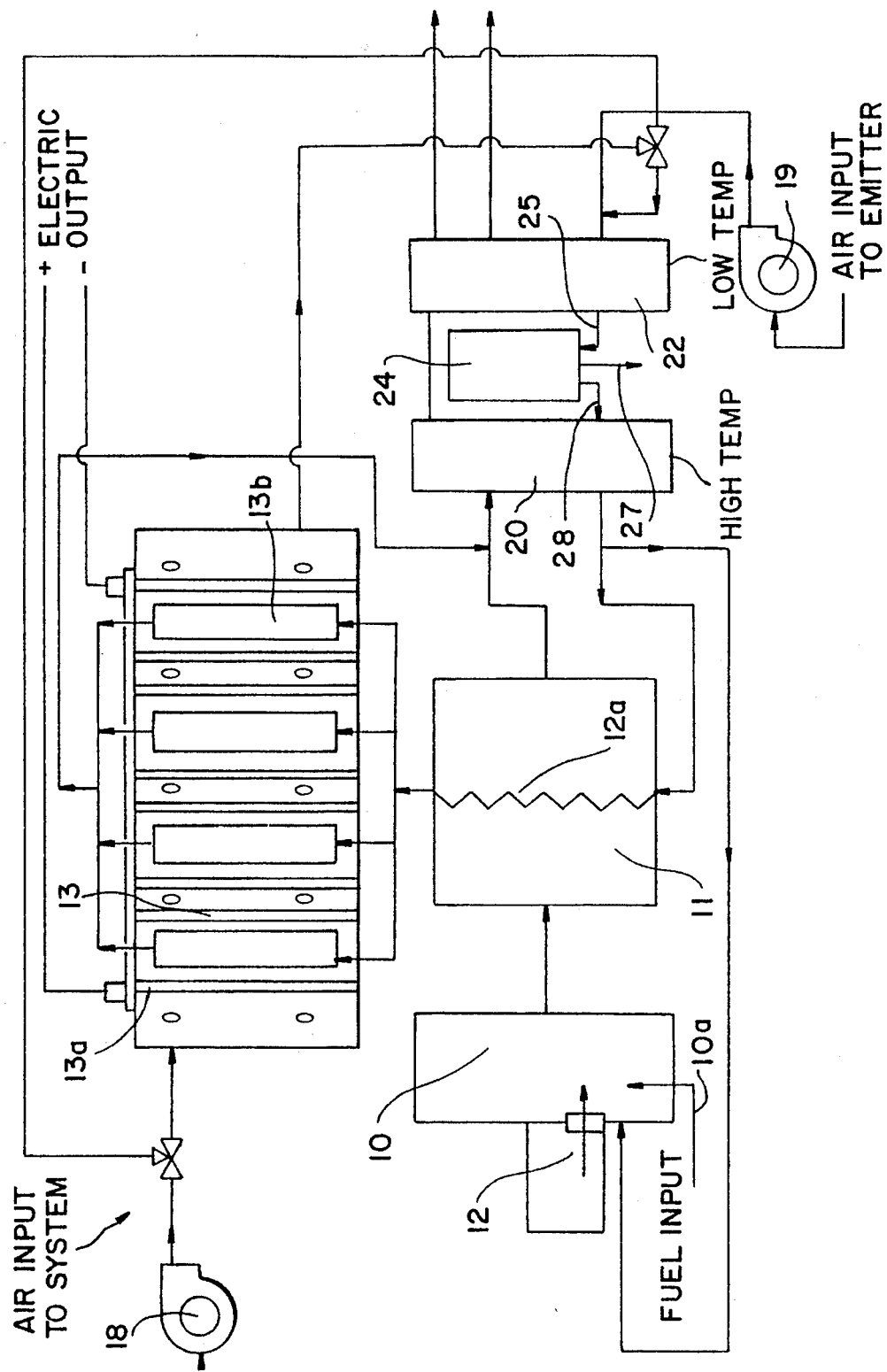
FIG. 3 shows schematically, an embodiment of the present invention substantially similar to that shown in FIG. 2, further including a pair of recuperating units and an oxygen separation membrane unit.

Turning now to FIG. 3, this schematic is substantially similar to FIG. 2, except for the addition of a pair of recuperating units 20 and 22 and an oxygen separation membrane unit 24, disposed between said recuperators. Air is passed through oxygen separation membrane unit 24 via line 25, where oxygen is selectively conducted electrolytically, under the influence of pressure, electrical current or other means. Nitrogen and other non-oxygen elements are exhausted via line 27. Pure oxygen molecules enter recuperator 20 via line 28 for preheating prior to admixture with fuel for forming a reactant mixture. As depicted in this schematic, one recuperator is a low temperature unit and the opposing recuperator is a high temperature unit.

THE EMITTER

In a most preferred embodiment, as opposed to the combustor and emitter being separate units, a porous ceramic matrix is used to serve both purposes. Such a porous ceramic matrix is more fully described herein. In a most preferred embodiment, the TPV systems of the present invention use photochemical ignition means to ignite and propagate combustion of air/fuel ratios of greater than about 3:1. Combustion can be maintained under these conditions at combustion temperatures which are between about 1,400° C. and 1,700° C., or higher, depending on the ceramic materials used and their temperature resistance. This combustion temperature range allows for preheat temperatures which are extraordinarily high without causing excessive combustion temperature. These conditions translate into extremely high thermal to radiant efficiencies as shown in the graph of FIG. 1.

The present invention contemplates use of an emitter which is capable of supporting combustion of a lean mixture of fuel and oxidant (reactants). These emitters are preferably ceramic materials which allow for combustion at temperatures from about 900° C. to about 2,000° C. over small or large surface areas. The geometry of the emitter should be designed for high thermodynamic efficiency and should be compact in size. Porous ceramic materials have been known to be useful in combustor systems. The use of porous ceramic media, whether in the reticulated solid form or using particle beds, such as beads or frit has been known to achieve leaner flame limits than conventional burners due to the porous layers acting as radiant heat exchangers. However, extremely lean-burn has not been possible even using porous ceramics because flame stabilization and flameout has been problematic. Burning in porous media is normally done at high flame speeds, typically around 20–100 cm/sec. or more. At high air/fuel ratios, i.e., lean-burning, the flame speed and flame temperature are reduced, ultimately dropping the flame speed to about 10 cm/sec. and resulting in extinguishment of the flame. Thus, achieving flame stabilization in a porous media at higher air-to-fuel ratios (lower than 10 cm/sec flame speeds) has heretofore not been successfully accomplished. Furthermore, radial heat loss, i.e., heat loss which exceeds the heat input to the flame, is also a major contributor to flameout.

The geometry and configuration of the emitter must also be capable of achieving a constant temperature profile along its surface area, which contributes to flame stabilization. The oxidant/fuel mixture is preferably distributed evenly throughout the emitter. The emitters may be made from a variety of materials, including metals and ceramics. Due to thermal shock concerns, it is preferred that ceramics with minimum thermal shock be employed. These materials can be classified as oxides, carbides, nitrides, borides, and mixtures of these materials. Thus, monolithic ceramics and composite ceramics may be employed. Specific oxides which are useful include $Al_2O_3$ (sapphire), $ZrO_2$, MgO, $MgAl_2O_4$ (spinel) as well as composites such as $Al_2O_5TiC$, $SiC$—$TiB_2$, $Si_3N_4$—TiC, $ZrO_2$—MgO, $ZrO_2$—$Y_2O_3$, $Al_2O_3$—$ZrO_2$, $Al_2O_3$—SiC, and the like. These materials may be formed into conventional microstructure forms, fibrous or interlocking microstructure forms, particulate dispersions, whisker dispersions, as well as fiber reinforced forms.

The materials selected for the combustor/emitter are preferably those with a high emissivity value. Emissivity is generally fixed as an inherent property of the material. The thermal radiative output (W/cm$^2$) is a function of the emissivity of the material. Thermal radiant output power is extremely important in applications such as TPV. An ideal or black emitter has an emissivity value of 1.0. The following table shows the emissivity of oxides as well as borides, carbides, and nitrides. It is apparent from the chart that the radiant thermal output of the latter group, which are considered black-type or gray emitters, is significantly higher than the former materials which are considered white materials. An example of a white material is $Al_2O_3$ and $ZrO_2$. An example of a black-type ceramic is SiC (silicon carbide).

| Temperature | Emissivity | Thermal Radiative Output (W/cm$^2$) |
| --- | --- | --- |
| Oxides | | |
| 1300 C | .30 | 10.4 |
| 1400 C | .30 | 13.3 |
| 1500 C | .30 | 16.8 |
| 1600 C | .30 | 20.9 |
| 1700 C | .30 | 25.8 |
| Borides, Nitrides, Carbides | | |
| 1300 C | .90 | 31.2 |
| 1400 C | .90 | 39.9 |
| 1500 C | .90 | 50.4 |
| 1600 C | .90 | 62.7 |
| 1700 C | .90 | 77.4 |

The ceramics may be used in the coated or uncoated form. For example, certain ceramics may be coated with another ceramic material which has a different emissivity than the substrate ceramic. The ceramic coating should preferably be matched for thermal expansion with the ceramic emitter base. In one particular embodiment, an oxide (white) ceramic having a low emissivity, e.g., 0.2–0.3, is coated with a higher emissivity material, i.e. 0.4–1.0. Coatings of oxidation resistant metal may also be used in place of the ceramic.

The ceramics of the present invention may be formed by a variety of processing techniques, including melting techniques, particulate formation techniques, vapor techniques, as well as chemical techniques. In the case of emitters made from microtubes, machining techniques, etching techniques, and vapor deposition techniques may be used. Preferably, the microtubes are formed in accordance with fugitive tube forming processes as described in U.S. Pat. Nos. 5,011,566 and 5,298,298, herein incorporated by reference.

In addition to microtubes, porous reticulated ceramics, foams, and fibrous materials as well as frit or particulate ceramics may be useful in the emitters of the present invention if properly configured. Oxidation resistance at temperatures of 1,700° C. or more is generally preferred and low or zero expansion materials which avoid or reduce thermal expansion and contraction forces, i.e. thermal shock forces, are considered to be most useful in the present invention.

In the case of ceramic materials, the geometry of the emitter may vary, depending on the application as well as the material selected. In the case of porous, reticulated ceramics, either cylindrical or planar emitters may be employed, while in a case of particle beds, the geometry will depend largely on the shape of the container in which the particle bed is situated. Foamed or fibrous ceramics are also contemplated.

Figure 4A:
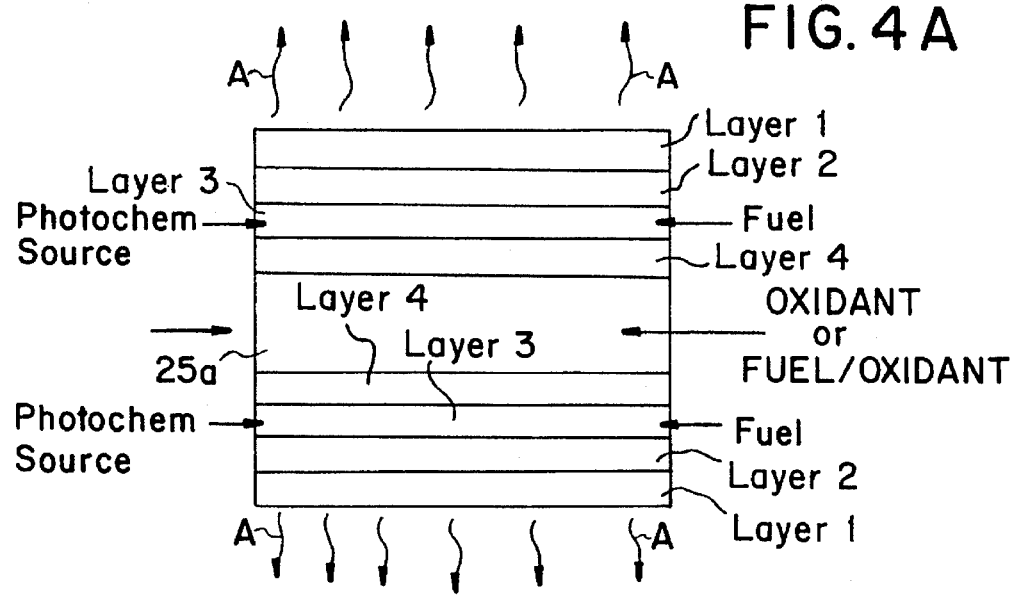
FIGS. 4a and 4b show in schematic cross-section planar configurations of combustor/emitter structures for use in accordance with the present invention.
Figure 4B:
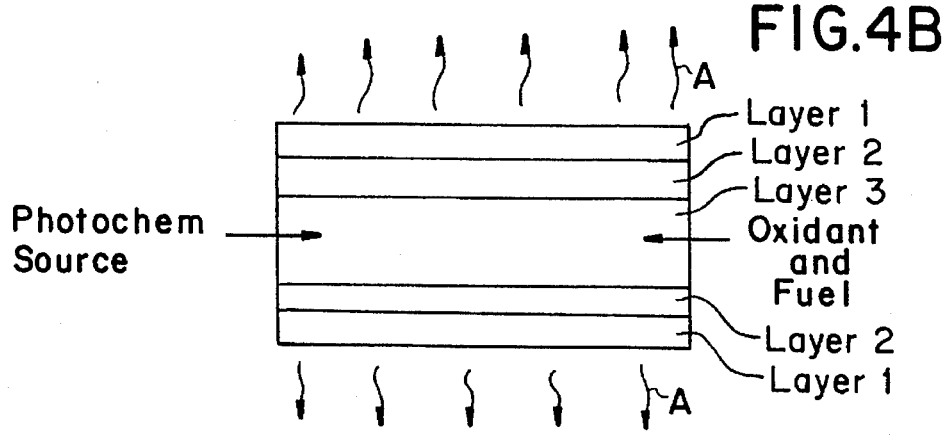

Referring to FIGS. 4a–c and 5, various combustor/emitter configurations are depicted. FIGS. 4a and 4b show in cross-section a planar configuration of the combustor/emitter of the present invention. FIG. 4a shows two stacks of four ceramic layers which define a combustion zone 25a. This combustion zone may be a void manifold area of a low pores per inch ceramic material. A reactant mixture comprising an oxidant/fuel mixture, e.g. air/fuel, is injected or otherwise introduced into the combustion zone 25a. A photochemical ignition source is positioned proximate to said emitter configuration and as shown in FIG. 4a, photochemical emissions are introduced into layer 3 at one end of the emitter, while fuel is introduced at the opposite end of the same layer. Each layer of the porous ceramic matrix has a porosity which can be tailored to achieve maximum air and fuel mixing, in the case where these reactants are not premixed, as well as to provide a large area of stable burning. Thus in one embodiment, layers 4 of each of said stacks may contain a relatively high number of pores per inch, e.g. 20 to 100 pores per inch (ppi). This layer has a large number of small pores to help contain the gas in layer 3 above. Layer 3 may be a void or manifold area or a high porosity ceramic material for receiving fuel or reactant mixture and as a location for photochemical ignition.

As depicted in FIG. 4a, thermal energy radiates (arrows A) from the outer surfaces of layer 1 in each of the stacks. Layer 2 in this configuration serves as a preheat layer for incoming reactant mixture and preferably is a high ppi material, e.g. 20 to 100 ppi. The outer surface of layer 2, adjacent to layer 1, is the surface on which the flame resides during combustion. Finally, layer 1 serves to stabilize the flame and is preferably a low ppi material.

FIG. 4b shows a similar configuration to FIG. 4a, only having 2 layers in each stack which define the combustion zone where the reactant is introduced and photochemical ignition ignites the reactant mixture and propagates the flame.

Figure 4C:
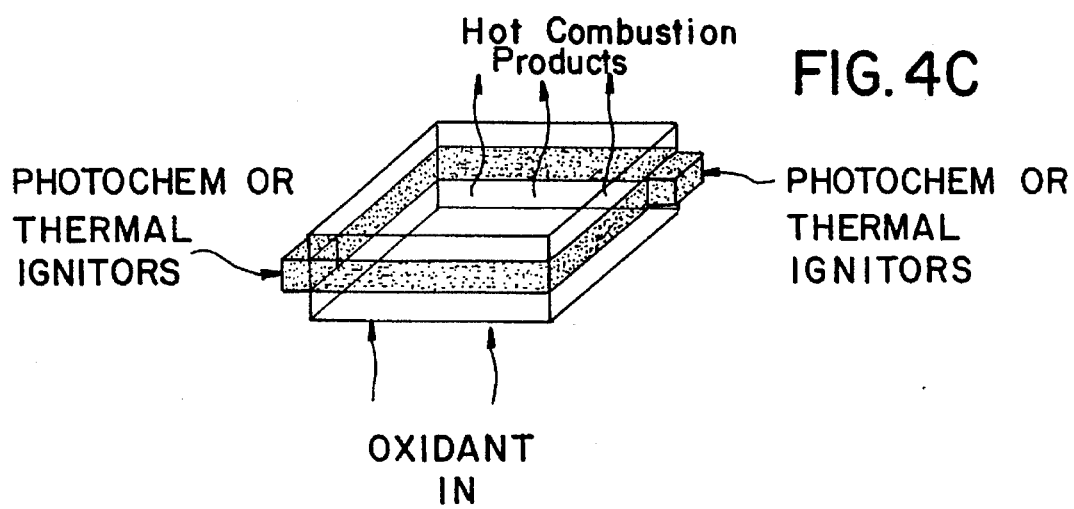
FIG. 4c shows in perspective, a portion of the planar configuration of the combustor/emitter structure of the type shown in FIGS. 4a and 4b.

FIG. 4C is a perspective of a portion of the planar configuration of the combustor/emitter structure useful in the present invention. One or more chemical or thermal igniters is shown. Three separate layers are shown, as well as the direction of oxidant input and flow of hot combustion products. The layers are indicated as being skinned SiC.

Figure 5:
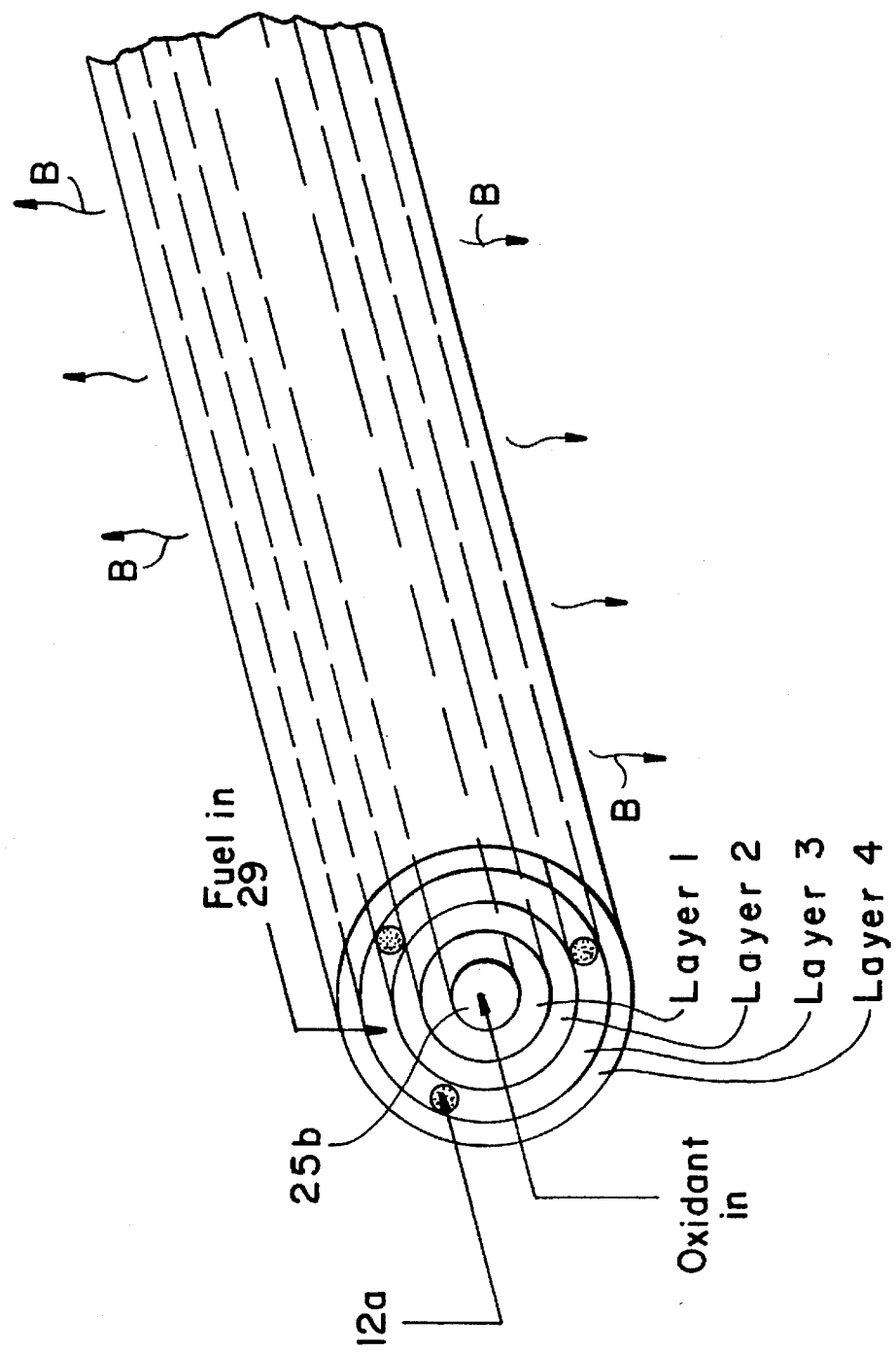
FIG. 5 shows a combustor/emitter structure of tubular configuration.

As shown in FIG. 5, an emitter configuration having a tubular design is depicted. As shown in the Figure, an array of concentric or nested tubular layers 1–4 are present. An inner core 25b for receiving oxidant is shown housed inside a first layer having a relatively low number of pores per inch. This layer serves to stabilize the combustion flame. A second layer external to and housing said first layer is also shown. This layer has a higher number of pores per inch relative to said first layer. Successive external layers 3 and 4 are also shown. This design further provides for windows 12b for introduction of photochemical ignition, as well as an injection port 29 for introduction of a fuel. Combustion products and radiant energy emanates from the tubular design as shown by arrows B.

As previously mentioned, it is preferred that the emitter be comprised of an array of microtubes which can be configured in bundles or layers to maximize surface area. The formation of such microtubes can be made in accordance with above incorporated U.S. Pat. Nos. 5,011,566 and 5,298,298. These patents describe microtubes made from various materials such as carbon, ferrous metal, non-ferrous metal, ceramic, oxides, nitrides, carbides, borides, semi-conductor, glass, carbon, or diamond to a microscopic fiber which is then removed. The coating material can be applied by several processes which include chemical vapor deposition, electrophoresis, and electroplating. Prior to coating, the fibers are fixed in a desired preform configuration for the finished tubes and then cleaned to facilitate uniform deposition of the coating material. The coating process is carried out in a non-oxidizing or inert environment. Once the fibers are coated with the microtube material, the fibers are removed by decomposing or dissolving the fiber core, leaving the hollow microtube shell. Preferably, the fiber core is removed by heating, in an oxidizing environment, to a temperature in which the fibers oxidize quickly without damaging the tube material.

Using this sacrificial fiber method, extremely small wall thicknesses and diameters of tubes can be made. For example, virtually any configuration of tube, i.e., straight, curved, coiled, etc., can be fabricated with diameters ranging from 1–1,000 microns and wall thicknesses starting at less than 0.01 microns. The microtubes can be bundled in an array, layered in successive planar modules or configured in any useful manner, whereby the thermodynamic efficiency of the burner can be maximized. Preferably, for use in the emitter the microtubes have porous walls.

Although ceramic microtubes are preferred, other materials such as metals may be useful. Among the metals which are useful include aluminum, boron, cerium, chromium, cobalt, copper, gold, hafnium, iridium, iron, magnesium, manganese, molybdenum, nickel, osmium, palladium, platinum, rhenium, rhodium, ruthenium, silicon, silver, tantalum, thorium, titanium, tungsten, zirconium, uranium, and the like. The specific material from which the microtube is composed will, of course, depend on the application and the temperature requirements.

In addition to providing an extremely large surface area, the microtube emitters can easily be configured geometrically to allow an unimpeded flow of combustion gases through the tubes, thereby reducing the amount of energy required to recover and recycle hot exhaust gases. The microtube emitter allows for reduced pressure drop from one end of the combustor/emitter to the other. Due to the high density of surface area which is characteristic of the microtube, extremely compact emitters may be fashioned, which have obvious advantages over the conventional burners and emitters which are usually large and bulky. Compact size is important for many applications, particularly in vehicles such as automobiles, military equipment and other mobile applications. Additionally, the high surface area density allows for emissivity values which can be tailored depending on the material and geometry or configuration of the emitter. Since the wall thickness can be controlled through extremely fine sizes, the emitter can be made extremely light weight and therefore low mass in addition to being compact.

As previously mentioned, the geometry and configuration of the emitter should be chosen to maximize thermodynamic efficiency. This includes taking into account such considerations as the ability to maintain a relatively constant temperature throughout the emitter, the ability to stabilize a lean-burn flame, the ability to minimize pressure differentials across and from one end of the emitter to the other, as well as the ability to burn at temperatures from 900° C. and higher, with particular emphasis on the temperature range of from 1,500°–1,900° C. since this range is the practical range given the temperature resistance of available materials. The combustion temperature chosen will of course vary depending on such factors as the type of material chosen, the air/fuel used, as well as the amount and temperature of recycled heat in the system. The aforementioned ceramic materials are preferred because they offer these advantages and can be easily constructed with porous walls to further increase surface area, gaseous throughput and can operate at the aforementioned temperature ranges. These materials also offer resistance to thermal shock. With respect to thermal shock, the present TPV system additionally overcomes thermal shock by providing a unique ignition system which allows very low temperature ignition thereby providing gradual or controllable ramp-up preheat of the emitter prior to reaching maximum operating temperatures required for efficient combustion.

HEAT RECOVERY

The TPV system of the present invention requires the use of a heat recovery means which can be accomplished in a number of ways. In one embodiment, a recuperator is used to recover heat which is emitted in the form of hot exhaust gases and combustion products and returned to the combustion zone and passed through the emitter to prevent heat loss in the system. The recuperator can be in the form of a manifolded structure which is properly insulated and positioned adjacent to the emitter, for example between the emitter and the combustor. In one embodiment, the recuperator can be an integral part of the emitter and formed from a microtube configuration similar to the emitter itself. The microtube recuperator would provide excellent means for recuperating the hot exhaust and combustion products back into the combustion chamber and emitter section. High efficiency heat exchange is possible due to the extreme surface area density of recuperators made from an array of microtubes. The microtube recuperator may be configured in a counter-flow or cross-flow fashion. In a counter-flow configuration, the exhaust gases are passing in a counter-flow direction to the reactant mixture which is supporting combustion. In a cross-flow configuration, the hot exhaust gases are recuperated in a direction 90° to the flow of the reactants. Due to the ability to configure virtually any size or shape tube, including making diameters extremely small and uniform, the fixed recuperators of the present invention allow for relatively constant temperatures to be achieved throughout the emitter surface. Constant temperature is a key requirement for flame stability, particularly when lean-burn mixtures, i.e. high oxidant/fuel or air/fuel ratios are employed.

Figure 6A:
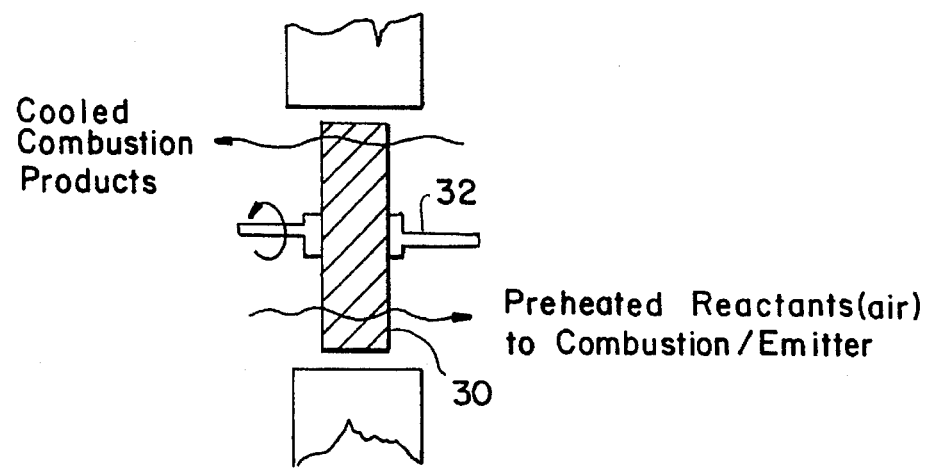
FIGS. 6a and 6b show rotary periodic flow type heat exchangers which may be used in accordance with the TPV system of the present invention.
Figure 6B:
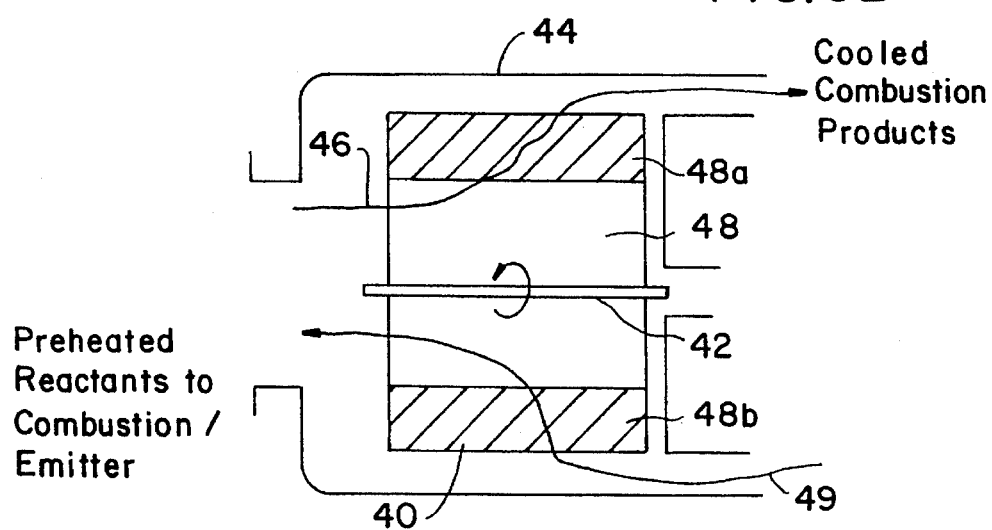
Figure 7:
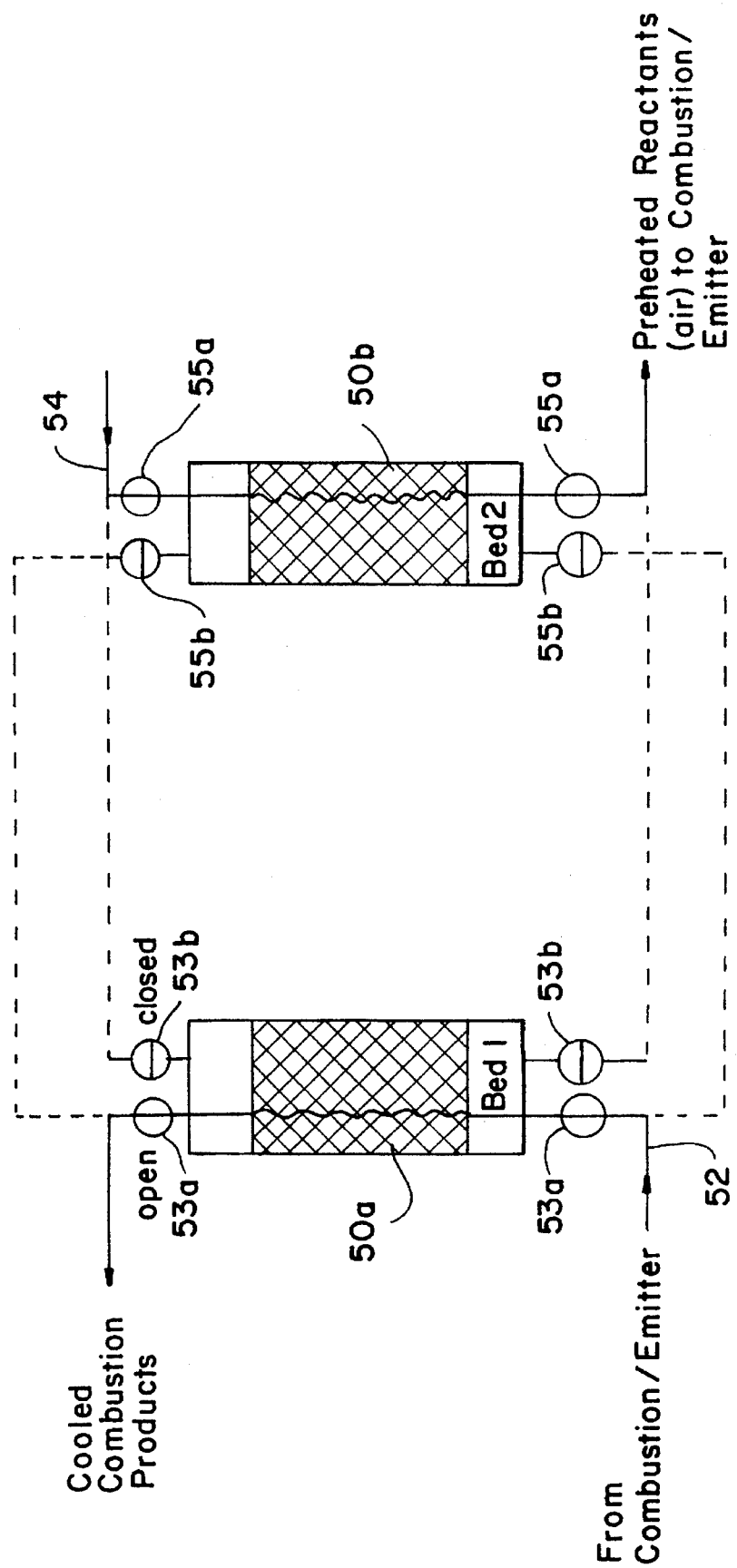
FIG. 7 shows a valve periodic flow-type heat exchanger which may be used in accordance with the TPV system of the present invention.

Examples of two types of heat exchangers (regenerator) useful in the present invention are depicted in FIGS. 6 and 7. FIGS. 6a and 6b show periodic-flow-type heat exchangers. Two rotary types are shown, an axial flow rotary (FIG. 6a) and a radial flow rotary (FIG. 6b). In the axial flow type shown in cross-section in FIG. 6a, a ceramic matrix in the form of a wheel 30 is shown. Ceramic wheel 30 rotates on an axle 32 about an axis therethrough. The ceramic wheel 30 rotates about the axis at a given rpm. Combustion products from the combustor/emitter pass through the ceramic wheel in one direction as shown at 34. Incoming air is preheated by passing through said ceramic wheel in the opposite direction of the flow of the combustion products, as shown at 36. The preheated air is then directed to the combustor/emitter.

In the radial flow heat exchanger, shown in cross-section in FIG. 6b, a ceramic matrix cylinder 40 rotates about an axis on axle 42. The rotating cylindrical ceramic matrix is housed in chamber 44. Combustion products from the combustor/emitter are brought in at opening 46 and directed into one segment of the cylinder bore 48. The combustion products then pass through the cylinder wall 48a and are directed outwardly. Concurrently, airstream 49 is preheated by passing through the wall of said ceramic cylinder at 48b, preheated, and directed to the combustor/emitter for combustion.

In each of the above rotary type heat exchangers, the ceramic matrix may be a reticulated foam or an array of microtubes as further described herein.

A valve-type oscillating heat exchanger is shown in FIG. 7. As shown in this figure, two ceramic matrices 50a and 50b which may be comprised of reticulated foam or a microtube arrangement, are used to preheat incoming air prior to entry into the combustor/emitter. This is accomplished by passing hot combustion gases from the combustor/emitter as shown at 52 through bed 1 while valves 53a are in the open position. The hot combustion gases serve to heat the bed in preparation for reactant gases which will be subsequently passed therethrough. While bed 1 is receiving hot combustion gases, valves 53b are closed. Valves 55a and 55b in bed 2, however, are open and air is passed through bed 2 as shown at 54 and preheated prior to directing it to the combustor/emitter. The process is reversed periodically and the valves 53a, 53b and 55a, 55b are alternated between the open and closed positions such that when bed 1 is being heated from combustion products, bed 2 is being cooled by passing heat to incoming air. Conversely, when bed 2 is being heated by hot combustion products, bed 1 is being cooled by incoming air.

Regeneration refers to oscillating heat flow such as that disclosed in U.S. Pat. No. 4,850,862 to Bjerklie, described above. In this instance, two combustors and one emitter or two combustor/emitters would be employed and combustion products generated from one combustor (or combustor/emitter) would be cycled through the emitter to an adjacent combustor (or combustor/emitter), and vice versa. The oscillation would alternate between the combustion mode and the regeneration mode. The heat recovery means can take forms such as those described above with respect to FIGS. 6 through 7. These heat exchangers/regenerators have compact surface area densities and may be effectively employed as the heat recovery means of the present invention.

PHOTOCHEMICAL IGNITION

The TPV system of the present invention employs a photochemical ignition system to initiate combustion. Photochemical ignition allows controllable ramping-up of the oxidant/fuel mixture temperature prior to the mixture flowing to the emitter where combustion is initiated. Ramped preheating is required for a number of reasons. In the preferred embodiments most materials should be slowly heated to prevent thermal shock and degradation of the emitter structure. Combustor start-up may begin with air/fuel reactant mixture of less than 3:1 which is ignited at a temperature of about 1,000° C.–1,200° C. Sufficient thermal and electric energy produced by such start-up can be used to drive the oxygen separation membrane unit 24 (FIG. 3), thereby providing oxygen which can be fed to the reactant mixture to raise the air/fuel ratio to greater than about 3:1 to boost temperature and efficiency. Additionally, photochemical ignition solves a major problem which occurs when the air/fuel ratio is greater than 3:1. For ratios greater than this, the flame extinguishes and extremely lean-burning is not possible. Using photochemical ignition, extremely high air/fuel ratios, for example, about 3:1 to about 30:1 can be achieved and flame stability maintained. Relatively low ignition energy is required as compared to spark ignition. At high temperatures, the creation of pollutants is problematic. Additionally, initiation of combustion using conventional thermal ignition, such as spark ignition, glow discharge and the like, does not readily offer means for controlling the rate of combustion or flame propagation speed as compared to photochemical control.

Photochemical ignition utilizes a source of ultra-violet energy designed to produce photodissociative photons which create a combustion intermediary species. For example, in the case of a fuel/oxygen mixture, oxygen molecules are dissociated into two oxygen atoms when irradiated with ultra-violet radiation of the appropriate wave length. Photochemical initiation is discussed in detail in U.S. Pat. Nos. 4,035,131 and 4,034,557 to Cerkanowicz. Room temperature ignition is possible by exposure to as little as 10 microjoules of ultra-violet radiation below about 2,450 Å. Once the oxygen atoms are generated by the appropriate UV wavelength, the oxygen/fuel mixture is ignited, allowing for maintenance of a flame under conditions that would ordinarily be impossible. Additionally, photochemical ignition proceeds at lower temperature as opposed to the higher temperatures required in thermal ignition.

Photochemical initiation of combustion, control of initiation of combustion, and control of combustion by means of irradiation by selected ultraviolet radiation can be used effectively over a wide range of pressure, temperature, flow conditions, turbulence, fuel type, and stoichiometry. Furthermore, the techniques can be used to reduce the delays in the combustion initiation process and enhance mixing fuel-oxygen-diluent reactant mixtures and control combustion instabilities.

It will be evident that many different techniques as outlined above are possible. For example, a continuous, pulsed or modulated power supply may be utilized, enabling the ultraviolet radiation source to operate in various modes such as: a single flash of appropriate duration; the source being on continuously at a level of intensity sufficient to precondition the fuel-oxygen-diluent mixture in depth, and then a flash superimposed to initiate combustion; sequential flashes of appropriate interval and duration; a source continuously on and capable of initiation of combustion. Furthermore, there may be more than one ultraviolet radiation source, such as: a number of ultraviolet sources, each turned or optimized to a separate wavelength region of radiation; a number of ultraviolet sources directed to irradiate various parts of a fuel/oxidizer mixture with variation in spectral distribution and intensity of the radiant output; a number of ultraviolet sources used in sequence or phased according to a preselected timing sequence that provides varying intensities and spectral distributions of ultraviolet radiation to the reactant mixture at varying times.

There may also be varied geometric relationship between a radiation source and a combustion chamber, such as one source to one chamber, one source for many chambers, one chamber with many sources.

An important realization of the present invention is that increasing the input energy results in a pronounced effect on the reaction front propagation velocity. For example, U.S. Pat. No. 4,034,557 discloses a stoichiometric hydrogen-oxygen mixture at 300 torr pressure and room temperature exposed to radiant energy levels which resulted from 200 to 300 joule energy inputs. The reaction front arrival time at photo-cells positioned at 7.52 cm and 12.52 cm from the radiant source window (ultraviolet grade sapphire) was interpreted to demonstrate that an increase in input energy by a factor of 10 results in reducing the reaction front arrival time approximately 50%. It is expected that a similar reduction in ignition delay can be brought about by increasing the input energy. The proposal that enhancement in depth is created by the generation of oxygen atoms is thus supported since, in the region discussed, ten times the normal oxygen atom concentration is generated for ten times the amount of energy. Increasing the input energy results in an increase in reaction front propagation velocity.

Photochemical ignition of a methane-air mixture can be made to occur at room temperature in times much less than the time involved in spark ignition and the ensuing propagating reaction front is stronger even without motion in the unburned gas. On the other hand, electric spark (thermal) ignition requires first a large temperature rise above room temperature, and propagates a weaker reaction front for similar conditions. In practice, substitution of a photochemical ignition source for a spark-ignition source should reduce the time required for combustion of the fuel charge.

An important aspect of the present invention relates to the use of photochemical ignition and combustion control within the combustion chamber of an internal combustion device for the purpose of reducing or eliminating exhaust pollutants, particularly nitric oxides. Pollution control is achieved by taking advantage of the different combustion characteristics that are possible with the photochemical method compared to the spark method. Direct control within the combustion chamber is accomplished by either initiating a rapid combustion front or ignition of fuel-lean mixtures.

Photochemical ignition can be demonstrated on a wide variety of fuels, including liquid or gaseous hydrocarbon mixtures. The ultra-violet radiation is absorbed by the oxygen molecules, as opposed to the fuel molecules. The energy required for thermal ignition is known to increase rapidly for decreasing fuel concentration, that is, when the air/fuel mixture ratio is high. Thus, in lean-burn situations, thermal ignition does not adequately support combustion and flame stability. Photochemical ignition maintains a virtually static energy requirement and allows for flame stability at extremely high air-to-fuel ratios.

The apparatus for achieving photochemical ignition comprises a UV radiation source capable of generating UV radiation at wave lengths sufficient to dissociate the oxygen molecules, as well as a means of delivering the photons to a desired location in the combustion chamber. The UV source is preferably an arc flashlamp or a laser beam. The wave length emitted should be sufficient to dissociate oxygen molecules in the air/fuel or oxidant/fuel mixture. Generally the wave length range necessary to achieve this ranges from about 1,400 Å to about 2,450 Å.

Figure 8A:
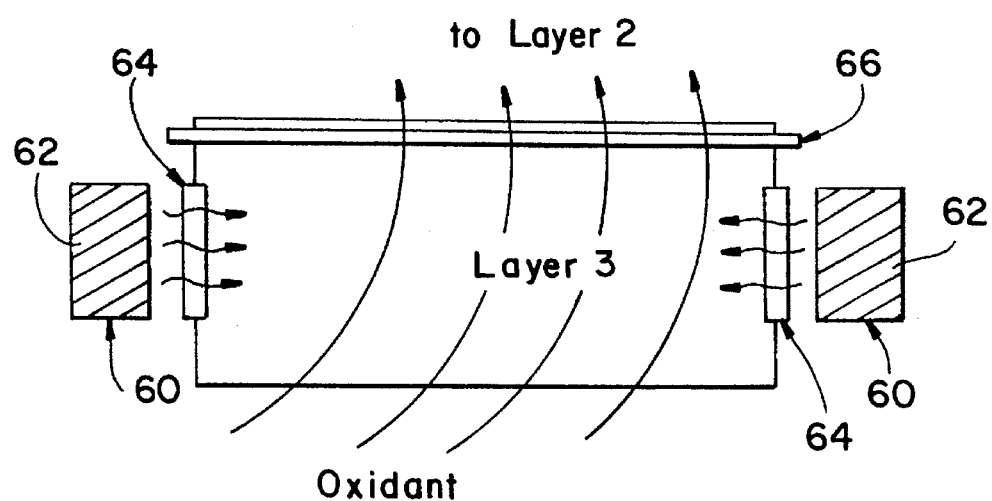
FIG. 8a shows a photovoltaic ignition system used in accordance with the TPV system of the present invention.

Referring to FIG. 8a, one embodiment of a photochemical ignition system is shown. As previously described hereinabove, the photochemical ignition system may be introduced into the combustor/emitter configurations in layer 3 as described in FIGS. 4 and 5. A cross-section of a ceramic layer of an emitter, e.g. layer 3, is shown with an adjacent photochemical emission source 60 including a power supply 62, which supplies the photochemical emission in the form of UV radiation. Intermediate said power supply 62 and ceramic layer 3 is window 64 which may be part of a collimating structure through which photochemical emissions are passed and enter ceramic layer 3. As previously mentioned, photochemical emissions may be pulsed, continuous, or otherwise modulated. As shown in the Figure, photochemical emission sources 60 may be placed at both ends of the ceramic matrix. Also, fuel tube/nozzle 66 directs incoming fuel and/or reactant mixture for combustion. In operation, photochemical radiation penetrates through the vacuum ultraviolet transmissive window 64 into the combustion zone, defined by layer 3. By varying the wavelength of the emitted ultraviolet radiation, control of the flame propagation as a function of location in layer 3 (combustion zone) is possible.

The collimating structure may be a tubular structure which houses an inert gas or vacuum to properly channel the photons from the arc flashlamp or laser to the desired location in the combustion chamber. An inert gas, such as nitrogen or argon is used such that the photons will remain virtually unaffected prior to being absorbed by the oxygen molecules. Alternatively, a vacuum may be employed in place of the inert gas. The collimating means may have a reflector or lens at one or both ends to properly focus and/or distribute the wave lengths to the precise location where dissociation is to occur. The lens may be made of a material selected from sapphire, lithium fluoride, magnesium fluoride, calcium fluoride, strontium fluoride, sodium fluoride, barium fluoride, $SiO_2$, and potassium fluoride. Photon radiation may be continuous, pulsed or modulated depending on the design and applications intended. Pulsing may be preferred in instances where energy must be conserved to produce overall efficiency in the TPV system.

Figure 8B:
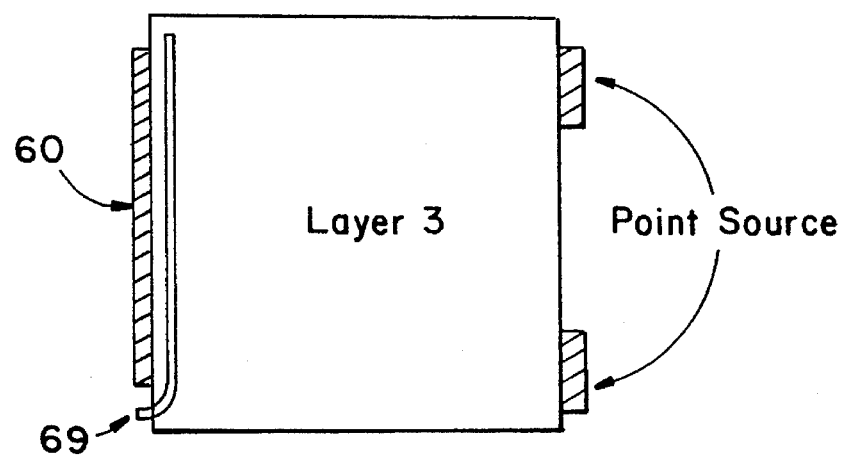
FIG. 8b shows a further embodiment of an ignition system which may be used in accordance with the present invention.

A further embodiment of the photovoltaic ignition system is shown in FIG. 8B. The photochemical ignition source 60 may be supplied by a thermal source shown by fuel rod 69.

PHOTOVOLTAIC CELL MEANS

The photovoltaic cells of the present invention may be chosen from a variety of semiconductor materials listed in columns III, IV, and V of the periodic table. In particular, Si and Ge from Group IV are well known semiconductors. However, more recently the focus has been on binary compounds resulting from combining elements from the various groups. For example, elements from Group III, Al and Ga, have been combined with Group V elements, P, As, and Sb, wherein this combination produces high performance photovoltaic cells. In particular, the following combinations are particularly useful: GaAs, GaSb, and InP. In addition to the binary combinations, ternary compounds have also produced high performance photovoltaic devices. These ternary compounds include AlGaAs, GaInAs, GaAsP, and InGaP$_2$.

The photovoltaic cells useful in the present invention may be single, multiple junction, or tandem structures made from the above-mentioned elements and having a bandgap which is tailored. For example, the bandgap may be engineered and typically in the range from about 0.4 eV to about 1.5 eV and preferably about 0.45 eV to about 1.1 eV.

It is known that photovoltaic cells are affected by temperature. They are most efficient at low temperatures, as determined by their material properties. All cell materials lose efficiency as the operating temperature rises. Thus, efficient removal of heat from the photocell and proper exposure to incoming radiation is required in order to maintain the cell's efficiency. The present invention incorporates a heat exchanger means for cooling the photocells and reclaiming thermal losses which can be recycled back into the combustion zone. The heat exchanger means may vary depending on the TPV application. Preferably, however, it is comprised of a microheat pipe structure, without porous walls. By rapidly and efficiently removing heat which results from incident radiation from the emitter, away from the photocell, cell efficiency can be enhanced.

As previously mentioned, photovoltaic cells useful in the present invention include both low-bandgap as well as high-bandgap cells. These bandgap ranges can be engineered by appropriate tailoring using single-junction, multi-junction, or tandem (monolithic) cells. Bandgap engineering can be used to create the desired TPV photocell matched to the emitter temperature in the range of 900° C. to 2,000° C. Typically, these cells are fabricated by growing the photovoltaic junctions in multi-layer epitaxial reactors or by forming the junctions by diffusion without epitaxy.

Antireflection technologies in the form of coatings for photovoltaic cells may be used to help reduce reflection of the desirable wavelengths of the incident radiation, thereby minimizing the amount of light reflected away from the cell's surface. Single or multiple layers of coatings may be used, to produce antireflection at a wide range of wavelengths. Additionally, cell surfaces may be textured to cause reflected light to strike a second surface before it can escape, thereby increasing the probability of absorption. Finally, geometric shapes, such as pyramid shapes may be incorporated into the cell surface to bend incident light such that it is reflected back and forth within the cell until completely absorbed.

Optionally, coupled to the photovoltaic cell may be a filtering device which selectively permits incident radiation of only a particular wavelength range to strike the cell. The filter selectively blocks longer infra-red radiation such that shorter radiation is absorbed and less thermal waste results. In the preferred embodiment, either one or more filters may be used, deposited directly on the photocell or outer substrate such as a highly transmissive sapphire or spinel layer. In another embodiment, the filter may be deposited directly on the emitter.

These filters are predominantly made from (1) multi-layer dielectric stacks, (2) dielectric-metal-dielectric stacks, or (3) transparent conducting oxide (TCO) coatings. Any combination of these three may be used. TCO films particularly exhibit the optical characteristics required for TPV because they exhibit high transmittance of short wavelengths to high reflectance in the near infra-red. In addition, texturing may be used for TCO films to reduce angular dependence of the optical properties. Use of TCO films alone or in combination with other coatings, for example, such as MgF$_2$, is contemplated.

OXYGEN SEPARATION MEMBRANE

In an effort to eliminate polluting emissions from the combustion process, it is preferred that pure oxygen be used as the oxidant in the fuel mixture. One embodiment of the present invention includes a means for producing oxygen using dense-ceramic solid electrolyte membranes. These membranes are particularly useful to produce pure oxygen from air, which can then be used in a mixture with the fuel for combustion. Pure oxygen is preferred at higher temperatures, since nitrogen-containing gases such as air produce NO$_x$ emissions at temperatures above about 1,000° C. The solid electrolyte oxygen separation membranes are made from materials which have oxygen vacancies in the crystal lattice. Oxygen ions jump from vacancy-to-vacancy across the membrane, driven either by a pressure differential across the membrane, or by an externally imposed electrical gradient. These membranes permit only oxygen to pass through them, thereby excluding other components of air. Oxygen-conductors are mainly found among oxide materials having a fluorite, distorted fluorite, or perovskite structure. Conduction of the oxygen occurs when oxygen vacancies are created in the lattice structure through the introduction of dopants or defects. Zirconium oxides (ZrO$_2$) are materials which have been successfully used as oxygen conductors.

Figure 9:
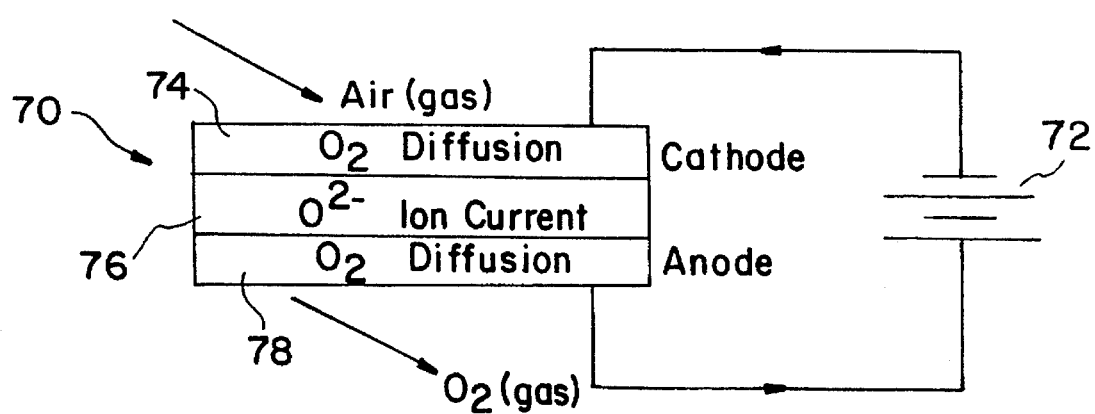
FIG. 9 shows an embodiment of the oxygen separation unit of the system of the present invention shown in FIG. 3.

As mentioned above, separation may occur in oxygen-separation unit 24 (FIG. 3) under pressure, electrical current, or other means. An example of use of electrical current is an oxygen separation unit as shown in FIG. 9, where a solid-state zirconia electrolyte cell 70 is shown.

The energy necessary to drive the separation process is supplied by the power supply 72. Oxygen in the air diffuses through the cathode 74 to the cathode-electrolyte interface. Under the influence of the applied voltage, oxygen molecules are dissociated and reduced to oxygen ions, O$^{2-}$. As an ionic species, oxygen enters the crystal lattice 76 of the electrolyte and moves toward the anode 78. At the anode, each ion gives up its two electrons which then enter the anode and return to the power supply 72, completing the circuit. The oxygen atoms recombine into O$_2$ and diffuse out through the anode 78. Because the zirconia conducts only oxygen ions, the gas on the output (anode) side of the cell is pure oxygen. The following equation describes the reaction:

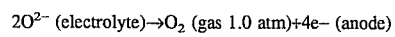

To impart oxygen ion conductivity to the material, pure zirconia (ZrO$_2$) must be doped with another oxide such as calcia (CaO) or yttria (Y$_2$O$_3$). Each dopant cation (Ca$^{2+}$ or Y$_{3+}$) replaces Zr$^{4+}$ ion; the net result is that the doped crystal is electrically neutral without having all oxygen ion sites filled. These oxygen ion vacancies impart in the substance an appreciable oxygen ion conductivity. Because the ionic conductivity is a strong function of temperature, the typical operating temperature of solid-state zirconia electrolyte cells is 1,000° C.

Separation of oxygen from air or other oxygen-containing gases by the solid-state zirconia electrolyte technique has several advantages over traditional methods of separation like cryogenic distillation or pressure-swing adsorption. Separation of oxygen by solid-state zirconia electrolyte technology lends itself well to modular construction, and thus is easily scaled. Oxygen separation cells can be stacked, forming a multi-cell stack; multiple stacks can be manifolded together to form a multi-stack module. The modularity inherent in the technology also simplifies maintenance procedures.

The above equation indicates that transfer of four electrons is required to conduct each oxygen molecule ($O_2$) through the electrolyte. Thus it is a simple matter to control the rate of oxygen production by controlling the current applied to the cells. This feature reduces the storage requirements of oxygen separation units and allows operators to better match production to demand. On a small scale, solid electrolyte cells could be used to meter precise amounts of oxygen to partial oxidation processes.

The basic solid electrolyte separation cell has no moving parts. This fact contributes to the high inherent reliability of the technology. The lack of moving parts, combined with the continuous, rather than batch, nature of the process result in a quiet, vibration-free system. Because the separation of oxygen from air by a solid-state zirconia electrolyte cell is an electrochemical process, the oxygen output stream is 100 percent oxygen. Other separation schemes, such as cryogenic distillation or pressure swing adsorption, cannot produce oxygen of this purity due to the basic processes used.

In addition to the previously described membranes, bismuth oxide may also be used because it also has a large number of moving ions and allows oxygen to move easily from site-to-site. High mobility indicates efficient diffusion and low activation energy for movement.

The membranes may comprise electronic and ionic conduction, sometimes referred to as mixed conduction. With electrical conduction, an external electric current is applied to cause the diffusion of the ions. Materials that are predominantly electronic conductors are classified as semiconductors. Materials which are dominated by ionic conduction are generally referred to as solid electrolytes. It is preferred that the materials of the present invention be of the solid electrolyte type, that is, they possess characteristics of only ionic conduction. In mixed conduction materials, pressure is required to effectuate oxygen separation. This requires that the electrical and ionic fluxes be essentially equal. Depending on the nature of the material, electrical or ionic conductivity of the material can be rate-limiting.

Several mixed-conducting materials exist which are similar to stabilized zirconias. For example, $CATi_{0.7}AL_{0.3}O_{3-x}$, $La_{0.8}Ca_{0.3}AlO_{3-x}$ and $CaTi_{0.95}Mg_{0.05}O_{3-x}$ are examples of such materials. Additionally, other materials which have been shown to be useful as oxygen-separation membranes include the perovskite $La_{1-x}Sr_xCoO_{3-\delta}$, as well as $La_{1-x}Sr_xCo_{1-y}Fe_yO_{3-\delta}$.

The oxygen-conducting electrolyte materials possess a variety of physical and chemical properties in addition to their ability to conduct oxygen. For example, among these properties include chemical stability and strength, thermal shock resistance, gas tightness and compatibility with other materials in the TPV system. These membranes may be self-supported or used in combination with supports or other layers of membrane. Alternatively, the solid electrolyte can be used as a thin layer over the surface of a much thicker, porous support. It is critical that the membrane be totally selected for oxygen. Thus, pin holes in the surface would destroy such selectivity, since these voids would allow ions other than oxygen to diffuse. The oxygen flux per unit area of membrane is directly proportional to membrane conductivity and inversely proportional to the thickness. In forming an oxygen membrane, the membrane support structure can be extruded and sintered, then coated with an ion-conducting separatory layer of yttria-stabilized zirconia, bismuth oxide, or perovskite. This layer would be prepared either by chemical/electrochemical vapor deposition, tape casting, slip casting, or other conventional methods used in preparing porous-ceramic membranes. In addition to the aforementioned materials, it is also believed that thoria and ceria are also believed to be useful oxygen electrolyte materials.

While particular embodiments have been shown and described, various modifications will be apparent to those skilled in the art, and therefore it is not intended that the invention be limited to the disclosed embodiments or to details thereof, and departures may be made therefrom within the spirit and scope of the invention.

What is claimed is:

1. A thermophotovoltaic (TPV) system comprising:
   a) an insulated housing containing a porous ceramic matrix and having a combustion zone for supporting combustion of a reactant mixture and for emitting radiant energy in response to said combustion;
   b) means for injecting an incoming reactant mixture into said ceramic matrix;
   c) photochemical ignition source means for emitting ignition photons and means for delivering said photons to said combustion zone in said ceramic matrix to ignite said reactants and propagate a combustion flame within said ceramic matrix;
   d) photocell means for receiving and converting said radiant energy into electricity; and
   e) heat recovery means for recovering heat of combustion and for preheating said reactant mixture.

2. The TPV system of claim 1 further including a filter for transmitting a selective wavelength range to said photocell.

3. The TPV system of claim 2 wherein said wavelength range is from about 1 to about 3 microns.

4. The TPV system of claim 1 further including heat exchanger means for cooling said photocell means, for preheating said incoming reactant mixture or for providing other energy to external applications.

5. The TPV system of claim 1 wherein said porous ceramic matrix is a planar configuration.

6. The TPV system of claim 1 wherein said porous ceramic matrix is a tubular configuration or spherical.

7. The TPV system of claim 1 wherein said ceramic matrix is a selective emitter material capable of selectively controlling emitting of said radiant energy such that the wavelength of said radiant energy correlates with the wavelength necessary to maximize photocell power density output.

8. The TPV system of claim 7 wherein said selective emitter material is a material selected from the group consisting of neodymia, holmia, erbia, and ytterbia.

9. The TPV system of claim 1 wherein said ceramic emitter comprises hollow-core microtubes.

10. The TPV system of claim 9 wherein said hollow-core microtubes have a porous wall structure.

11. The TPV system of claim 10 wherein said porous wall structure has a porosity of at least about 30%.

12. The TPV system of claim 9 wherein said microtubes have an average diameter of from about 1 micron to about 1000 microns.

13. The TPV system of claim 1 wherein said ceramic emitter has a radiative thermal output of at least about 31.2 to about 77.4 W/cm$^2$.

14. The TPV system of claim 13 wherein said ceramic emitter has a radiative thermal output sufficient to achieve a power density of at least about 2 watts/cm$^2$ of electricity.

15. The TPV system of claim 1 wherein said ceramic emitter has an emissivity of about 0.2 to about 1.0.

16. The TPV system of claim 1 wherein said photochemical ignition source emits photons at a wave length sufficient to dissociate oxygen molecules.

17. The TPV system of claim 1 wherein said means for delivering said photons comprises a chamber for housing an inert atmosphere and collimating said photons.

18. The TPV system of claim 17 wherein said chamber for housing an inert atmosphere is a vacuum tube.

19. The TPV system of claim 17 wherein said inert atmosphere is nitrogen or argon gas.

20. The TPV system of claim 17 wherein said chamber for housing an inert atmosphere further comprises a lens or reflector means at each end of said chamber for distributing said photons.

21. The TPV system of claim 20 wherein said lens means is made of a material selected from the group consisting of sapphire, lithium fluoride, magnesium fluoride, calcium fluoride, strontium fluoride, sodium fluoride, barium fluoride, SiO$_2$, and potassium fluoride.

22. The TPV system of claim 1 wherein said porous ceramic emitter has a pore size of about 5 to about 100 pores per inch.

23. A Thermophotovoltaic (TPV) system capable of operating with substantially reduced nitrogen-containing emissions, comprising:

a) a combustion chamber for combustion of a fuel;

b) a porous ceramic combustor/emitter for supporting combustion of a reactant mixture and for emitting radiant energy in response to said combustion;

c) means for introducing a reactant mixture into said combustor/emitter;

d) photochemical ignition means for emitting fuel igniting photons and means for delivering said photons to a predetermined location in said combustion chamber to ignite said fuel and to generate a combustion flame within said combustion chamber;

e) photocell means for receiving and converting said radiant energy into electricity;

f) heat exchanger means for cooling said photocells and reclaiming photocell heat loss;

g) heat recovery means for receiving and recycling hot exhaust from said combustion chamber;

h) membrane means for selectively delivering pure oxygen as the oxidant; and i) insulation means for minimizing system heat loss.

24. The TPV system of claim 23 wherein said porous ceramic combustor/emitter comprises a foamed reticulated ceramic.

25. The TPV system of claim 23 wherein said porous ceramic combustor/emitter comprises an array of microtubes.

26. The TPV system of claim 25 wherein the walls of said array of microtubes contain axial or radial pores.

27. The TPV system of claim 23 wherein said membrane means for selectively delivering pure oxygen as the combustion fuel comprises a solid oxygen-conducting electrolyte membrane.

28. The TPV system of claim 23 wherein said photochemical ignition means emits photons at a wavelength sufficient to dissociate oxygen molecules.

29. The TPV system of claim 23 further including a combustion chamber for housing an inert atmosphere which comprises a lens or reflector means at each end of said chamber for distributing said photons.

30. The TPV system of claim 29 wherein said lens means is made from a material selected from the group consisting of sapphire, lithium fluoride, magnesium fluoride, calcium fluoride, strontium fluoride, sodium fluoride, barium fluoride, SiO$_2$, and potassium fluoride.

31. A thermophotovoltaic (TPV) system comprising:

(a) a housing containing an emitter for emitting radiant energy in response to combustion and a combustion zone for supporting combustion of at least one reactant;

(b) means for injecting incoming reactant into said combustion zone;

(c) ignition means to ignite said reactant and propagate a combustion flame within said combustion zone;

(d) photocell means for receiving and converting said radiant energy into electricity;

(e) heat recovery means for recovering heat of combustion and for preheating a reactant, an oxidant, or a mixture thereof; and (f) membrane means for selectively delivering oxygen as an oxidant.

32. The thermophotovoltaic (TPV) system of claim 31 further including a filter for selectively permitting radiation of a particular wavelength range to strike said photocell means.

33. The thermophotovoltaic (TPV) system of claim 31 wherein said emitter has a geometry selected from the group consisting of a planar configuration, a spherical configuration, and a tubular configuration.

34. The thermophotovoltaic (TPV) system of claim 31 wherein said combustion zone includes at least a portion of said emitter.

35. The thermophotovoltaic (TPV) system of claim 31 wherein said emitter is selected from the group consisting of a ceramic material and a metal material.

36. The thermophotovoltaic (TPV) system of claim 31 wherein said emitter is a ceramic matrix comprised of a selective emitter material capable of selectively controlling emitting of said radiant energy such that the wave length of said radiant energy correlates with the wave length necessary to maximize photocell power density output.

37. The thermophotovoltaic (TPV) system of claim 36 wherein said selective emitter material is a material selected from the group consisting of neodymia, holmia, erbia, and ytterbia.

38. The thermophotovoltaic (TPV) system of claim 31 wherein said membrane means for selectively delivering oxygen as an oxidant is a material selected from the group consisting of zirconia, fluorite, bismuth oxide, and perovskite.

39. The thermophotovoltaic (TPV) system of claim, 31 wherein said emitter comprises hollow-core microtubes.

40. The thermophotovoltaic (TPV) system of claim 39 wherein said hollow-core microtubes have a porous wall structure.

41. The thermophotovoltaic (TPV) system of claim 40 wherein said porous wall structure has a porosity of at least about 30%.

42. The thermophotovoltaic (TPV) system of claim 39 wherein said microtubes have an average diameter from 1 micron to about 1,000 microns.

43. The thermophotovoltaic (TPV) system of claim 31 wherein said emitter has a radiative thermal output of at least about 31.2 to about 77.4 W/cm$^2$.

44. The thermophotovoltaic (TPV) system of claim 43 wherein said emitter has a radiative thermal output sufficient to achieve a power density of at least about 2 watts/cm$^2$ of electricity.

45. The thermophotovoltaic (TPV) system of claim 31 wherein said emitter has an emissivity of about 0.2 to about 1.0.

46. The thermophotovoltaic (TPV) system of claim 31 wherein said ignition means comprises a photochemical ignition source which emits photons at a wave length sufficient to dissociate oxygen molecules.

47. The thermophotovoltaic (TPV) system of claim 46 wherein said photochemical ignition source includes a chamber for housing an inert atmosphere and collimating said photons.

48. The thermophotovoltaic (TPV) system of claim 47 wherein said chamber is a vacuum tube containing an inert gas.

49. The thermophotovoltaic (TPV) system of claim 47 wherein said chamber includes a lens or reflector means at each end of said chamber for distributing said photons.

50. The thermophotovoltaic (TPV) system of claim 49 wherein said lens means is made of a material selected from the group consisting of sapphire, lithium fluoride, magnesium fluoride, calcium fluoride, strontium fluoride, sodium fluoride, barium fluoride, $SiO_2$, and potassium fluoride.

51. The thermophotovoltaic (TPV) system of claim 31 wherein said emitter has a pore size of about 5 to about 100 pores per inch.

52. The thermophotovoltaic (TPV) system of claim 31 further including a heat exchanger means for cooling said photocells and reclaiming photocell heat loss.

53. A thermophotovoltaic (TPV) system comprising:
  (a) a chamber containing an emitter made of a material selected from the group consisting of ceramics and metals, and a combustion zone for supporting combustion of at least one reactant;
  (b) means for providing a reactant mixture into said combustion zone, said reactant mixture having an oxidant/fuel ratio greater than about 3:1;
  (c) ignition means to ignite said reactant mixture and propagate a combustion flame within said combustion zone;
  (d) photocell means for receiving and converting radiant energy into electricity;
  (e) heat recovery means for recovering heat of combustion and for preheating a reactant, an oxidant or a mixture thereof; and
  (f) membrane means for selectively delivering oxygen as an oxidant.

54. The thermophotovoltaic (TPV) system of claim 53 wherein said combustion zone includes at least a portion of said emitter.

55. The thermophotovoltaic (TPV) system of claim 53 wherein said emitter has a geometry selected from the group consisting of a planar configuration, a spherical configuration, an a tubular configuration.

56. The thermophotovoltaic (TPV) system of claim 53 further including a filter for selectively permitting radiation of a particular wavelength range to strike said photocell means.

57. The thermophotovoltaic (TPV) system of claim 53 wherein said emitter is a porous ceramic matrix.

58. The thermophotovoltaic (TPV) system of claim 57 wherein said porous ceramic matrix is comprised of a selective emitter material capable of selectively controlling emitting of said radiant energy such that the wave length of said radiant energy correlates with the wave length necessary to maximize photocell power density output.

59. The thermophotovoltaic (TPV) system of claim 58 wherein said selective emitter material is a material selected from the group consisting of neodymia, holmia, erbia, and ytterbia.

60. The thermophotovoltaic (TPV) system of claim 57 wherein said emitter has a pore size of about 5 to about 100 pores per inch.

61. The thermophotovoltaic (TPV) system of claim 53 wherein said membrane means for selectively delivery oxygen as an oxidant is a material selected from the group consisting of zirconia, fluorite, bismuth oxide, and perovskite.

62. The thermophotovoltaic (TPV) system of claim 53 wherein said emitter comprises hollow-core microtubes.

63. The thermophotovoltaic (TPV) system of claim 62 wherein said hollow-core microtubes have a porous wall structure.

64. The thermophotovoltaic (TPV) system of claim 63 wherein said porous wall structure has a porosity of at least about 30%.

65. The thermophotovoltaic (TPV) system of claim 62 wherein said microtubes have an average diameter from about 1 micron to about 1,000 microns.

66. The thermophotovoltaic (TPV) system of claim 53 wherein said emitter has a radiative thermal output of at least about 31.2 to about 77.4 W/cm$^2$.

67. The thermophotovoltaic (TPV) system of claim 66 wherein said emitter has a radiative thermal output sufficient achieve a power density of at least about 2 watts/cm$^2$ of electricity.

68. The thermophotovoltaic (TPV) system of claim 53 wherein said emitter has an emissivity of about 0.2 to about. 1.0.

69. The thermophotovoltaic (TPV) system of claim 53 wherein said ignition means comprises a photochemical ignition source which emits photons at a wave length sufficient to dissociate oxygen molecules.

70. The thermophotovoltaic (TPV) system of claim 69 wherein said photochemical ignition source includes a chamber for housing an inert atmosphere and collimating said photons.

71. The thermophotovoltaic (TPV) system of claim 70 wherein said chamber is a vacuum tube containing an inert gas.

72. The thermophotovoltaic (TPV) system of claim 70 wherein said chamber includes a lens or reflector means at each end of said chamber for distributing said photons.

73. The thermophotovoltaic (TPV) system of claim 72 wherein said lens means is made of a material selected from the group consisting of sapphire, lithium fluoride, magnesium fluoride, calcium fluoride, strontium fluoride, sodium fluoride, barium fluoride, $SiO_2$, and potassium fluoride.

74. The thermophotovoltaic (TPV) system of claim 53 further including a heat exchanger means for cooling said photocells and reclaiming photocell heat loss.

75. A thermophotovoltaic (TPV) system comprising:
  (a) a chamber containing an emitter made of a material selected from the group consisting of ceramics and metals, and a combustion zone for supporting combustion of a reactant;
  (b) means for providing a reactant mixture into said combustion zone, said reactant mixture having an air/fuel ratio of greater than about 3:1;
  (c) photochemical ignition source means for emitting ignition photons and means for delivering said photons to said combustion zone to ignite said reactant and propagate a combustion flame;

(d) photocell means for receiving and converting radiant energy into electricity; and (e) heat recovery means for recovering heat of combustion and for preheating a reactant, an oxidant or a mixture thereof.

76. The thermophotovoltaic (TPV) system of claim 75 further including a filter for selectively permitting radiation of a particular wavelength range to strike said photocell means.

77. The thermophotovoltaic (TPV) system of claim 75 wherein said emitter has a geometry selected from the group consisting of a planar configuration, a spherical configuration, and tubular configuration.

78. The thermophotovoltaic (TPV) system of claim 75 wherein said combustion zone includes at least a portion of said emitter.

79. The thermophotovoltaic (TPV) system of claim 75 wherein said emitter is a porous ceramic matrix.

80. The thermophotovoltaic (TPV) system of claim 79 wherein said porous ceramic matrix is comprised of a selective emitter material capable of selectively controlling emitting of said radiant energy such that the wave length of said radiant energy correlates with the wave length necessary to maximize photocell power density output.

81. The thermophotovoltaic (TPV) system of claim 80 wherein said selective emitter material is a material selected from the group consisting of neodymia, holmia, erbia, and ytterbia.

82. The thermophotovoltaic (TPV) system of claim 75 wherein said emitter comprises hollow-core microtubes.

83. The thermophotovoltaic (TPV) system of claim 82 wherein said hollow-core microtubes have a porous wall structure.

84. The thermophotovoltaic (TPV) system of claim 83 wherein said porous wall structure has a porosity of at least about 30%.

85. The thermophotovoltaic (TPV) system of claim 82 wherein said microtubes have an average diameter from about 1 micron to about 1,000 microns.

86. The thermophotovoltaic (TPV) system of claim 75 wherein said emitter has a radiative thermal out put of at least about 31.2 to about 77.4 W/cm$^2$.

87. The thermophotovoltaic (TPV) system of claim 86 wherein said emitter has a radiative thermal output sufficient to achieve a power density of at least about 2 watts/cm$^2$ of electricity.

88. The thermophotovoltaic (TPV) system of claim 75 wherein said emitter has an emissivity of about 0.2 to about 1.0.

89. The thermophotovoltaic (TPV) system of claim 75 wherein said ignition means comprises a photochemical ignition source which emits photons at a wave length sufficient to dissociate oxygen molecules.

90. The thermophotovoltaic (TPV) system of claim 89 wherein said photochemical ignition source includes a chamber for housing an inert atmosphere and collimating said photons.

91. The thermophotovoltaic (TPV) system of claim 90 wherein said chamber is a vacuum tube containing an inert gas.

92. The thermophotovoltaic (TPV) system of claim 90 wherein said chamber includes a lens or reflector means at each end of said chamber for distributing said photons.

93. The thermophotovoltaic (TPV) system of claim 92 wherein said lens means is made of a material selected from the group consisting of sapphire, lithium fluoride, magnesium fluoride, calcium fluoride, strontium fluoride, sodium fluoride, barium fluoride, SiO$_2$, and potassium fluoride.

94. The thermophotovoltaic (TPV) system of claim 79 wherein said emitter has a pore size of about 5 to about 100 pores per inch.

95. The thermophotovoltaic (TPV) system of claim 75 further including heat exchanger means for cooling said photocells and reclaiming photocell heat loss.

* * * * *

UNITED STATES PATENT AND TRADEMARK OFFICE
CERTIFICATE OF CORRECTION

PATENT NO. : 5,512,108
DATED : April 30, 1996
INVENTOR(S) : Darryl L. Noreen

It is certified that error appears in the above-indentified patent and that said Letters Patent is hereby corrected as shown below:

At column 3, line 42, "preheat incoming reactants, air and fuel" should read --preheat incoming reactants, e.g. air and fuel--.

At column 8, line 23, "low temperature exhaust" should read --low temperature air exhaust--.

At column 10, line 21, "or more is generally" should read --or more are generally--.

At column 11, line 13, "for receiving oxidant" should read --for receiving oxidant mixture--.

At column 18, line 63, "or $Y_{3+}$)" should read --or $Y^{3+}$)--.

At column 19, line 53, "$CATi_{0.7}$" should read --$CaTi_{0.7}$--.

At column 19, line 54, "$La_{0.8}$" should read --$La_{0.7}$--.

At column 23, line 58, "an a tubular" should read --and a tubular--.

At column 24, lines 29-30, "sufficient achieve" should read "sufficient to achieve--.

At column 25, line 15, "and tubular" should read --and a tubular--.

At column 26, line 5, "thermal out put" should read --thermal output--.

UNITED STATES PATENT AND TRADEMARK OFFICE
CERTIFICATE OF CORRECTION

PATENT NO. : 5,512,108
DATED : April 30, 1996
INVENTOR(S) : Darryl L. Noreen

It is certified that error appears in the above-indentified patent and that said Letters Patent is hereby corrected as shown below:

At column 26, line 5, "thermal out put" should read --thermal output--.

Signed and Sealed this

Seventeenth Day of December, 1996

Attest:

BRUCE LEHMAN

*Attesting Officer*   *Commissioner of Patents and Trademarks*